US011202050B2

(12) United States Patent
Oh et al.

(10) Patent No.: US 11,202,050 B2
(45) Date of Patent: Dec. 14, 2021

(54) DATA PROCESSING METHOD AND DEVICE FOR ADAPTIVE IMAGE PLAYING

(71) Applicant: LG ELECTRONICS INC., Seoul (KR)

(72) Inventors: Hyunmook Oh, Seoul (KR); Jongyeul Suh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 223 days.

(21) Appl. No.: 16/341,614

(22) PCT Filed: Oct. 13, 2017

(86) PCT No.: PCT/KR2017/011302
§ 371 (c)(1),
(2) Date: Apr. 12, 2019

(87) PCT Pub. No.: WO2018/070822
PCT Pub. Date: Apr. 19, 2018

(65) Prior Publication Data
US 2020/0053334 A1  Feb. 13, 2020

Related U.S. Application Data

(60) Provisional application No. 62/408,082, filed on Oct. 14, 2016.

(51) Int. Cl.
H04N 5/253 (2006.01)
H04N 9/87 (2006.01)
H04N 9/77 (2006.01)

(52) U.S. Cl.
CPC .............. *H04N 9/87* (2013.01); *H04N 9/77* (2013.01)

(58) Field of Classification Search
USPC .......................................... 348/77
See application file for complete search history.

(56) References Cited

U.S. PATENT DOCUMENTS 10,791,364 B2 * 9/2020 Tsokagoshi ........ H04N 21/2365
10,878,776 B2 * 12/2020 Van Mourik ............ G09G 5/02
(Continued)

FOREIGN PATENT DOCUMENTS

KR  10-2011-0091852 A  8/2011
KR  10-2014-0021191 A  2/2014
(Continued)

*Primary Examiner* — Nigar Chowdhury
(74) *Attorney, Agent, or Firm* — Birch, Stewart, Kolasch & Birch, LLP

(57) ABSTRACT

According to one embodiment of the present invention, a data processing method comprises the steps of generating an uncompressed data signal and transmitting the uncompressed data signal and an InfoFrame, wherein the InfoFrame is a data transmission structure for transmitting information to a sink device receiving the uncompressed data signal, and includes a color volume descriptor for describing information on color volume, and the InfoFrame includes type information for indicating the type of color volume according to an object of the color volume, color volume type information for indicating the type of color volume according to a method of defining the color volume, and color space type information for indicating the type of color space in which the color volume is expressed.

14 Claims, 27 Drawing Sheets

(56) References Cited

U.S. PATENT DOCUMENTS

| | | | | |
|---|---|---|---|---|
| 2007/0019006 | A1* | 1/2007 | Marcu | G02B 26/005 345/690 |
| 2009/0010253 | A1* | 1/2009 | Kobayashi | H04N 21/2381 370/389 |
| 2010/0020106 | A1* | 1/2010 | Gil | G09G 5/02 345/690 |
| 2010/0073574 | A1* | 3/2010 | Nakajima | H04N 21/6373 348/723 |
| 2011/0013208 | A1* | 1/2011 | Bhaskaran | H04N 1/6027 358/1.9 |
| 2011/0292185 | A1* | 12/2011 | Takenaka | H04N 13/10 348/51 |
| 2011/0304522 | A1* | 12/2011 | Zeng | G09G 5/006 345/1.1 |
| 2012/0038782 | A1* | 2/2012 | Messmer | H04N 19/467 348/207.1 |
| 2012/0069154 | A1* | 3/2012 | Talstra | H04N 13/167 348/51 |
| 2012/0256943 | A1* | 10/2012 | Atkins | G06T 5/009 345/590 |
| 2012/0314129 | A1* | 12/2012 | Mertens | H04N 19/186 348/474 |
| 2012/0321273 | A1* | 12/2012 | Messmer | H04N 13/128 386/224 |
| 2013/0050245 | A1* | 2/2013 | Longhurst | H04N 9/67 345/590 |
| 2013/0120656 | A1* | 5/2013 | Wilson | G09G 5/005 348/563 |
| 2013/0194321 | A1* | 8/2013 | Wan | H04N 1/644 345/690 |
| 2014/0079113 | A1* | 3/2014 | Newton | H04N 19/98 375/240.01 |
| 2014/0210847 | A1* | 7/2014 | Knibbeler | H04N 9/68 345/589 |
| 2014/0233914 | A1* | 8/2014 | Williams | H04N 9/68 386/280 |
| 2014/0321555 | A1* | 10/2014 | Rossato | H04N 19/85 375/240.26 |
| 2015/0117791 | A1* | 4/2015 | Mertens | H04N 19/625 382/239 |
| 2015/0201222 | A1* | 7/2015 | Mertens | H04N 19/196 382/233 |
| 2015/0277840 | A1* | 10/2015 | Ninan | G09G 5/026 345/589 |
| 2015/0319416 | A1* | 11/2015 | Nakajima | H04N 21/426 348/474 |
| 2015/0358646 | A1* | 12/2015 | Mertens | H04N 9/68 382/166 |
| 2016/0035313 | A1* | 2/2016 | Zhang | H04N 21/43632 348/474 |
| 2016/0205371 | A1* | 7/2016 | Wallace | G06T 5/007 348/571 |
| 2016/0225342 | A1* | 8/2016 | Smolic | G09G 5/06 |
| 2016/0227001 | A1* | 8/2016 | Kumano | H04L 47/38 |
| 2016/0241829 | A1* | 8/2016 | Qu | H04N 7/0806 |
| 2016/0277793 | A1* | 9/2016 | Eyer | H04N 21/8358 |
| 2016/0323556 | A1* | 11/2016 | Luginbuhl | G06T 5/007 |
| 2016/0366449 | A1* | 12/2016 | Stessen | H04N 19/85 |
| 2017/0034521 | A1* | 2/2017 | Su | H04N 19/182 |
| 2017/0054989 | A1* | 2/2017 | Stessen | H04N 19/44 |
| 2017/0085894 | A1* | 3/2017 | Ramasubramanian | H04N 19/184 |
| 2017/0085895 | A1* | 3/2017 | Gu | H04N 19/46 |
| 2018/0052494 | A1* | 2/2018 | Coburn | B60N 2/002 |
| 2020/0404343 | A1* | 12/2020 | Van Der Vleuten | G06T 5/009 |
| 2021/0006793 | A1* | 1/2021 | Minoo | |

FOREIGN PATENT DOCUMENTS

| | | |
|---|---|---|
| KR | 10-2014-0066771 A | 6/2014 |
| KR | 10-2014-0098545 A | 8/2014 |
| KR | 10-2016-0052571 A | 5/2016 |

* cited by examiner

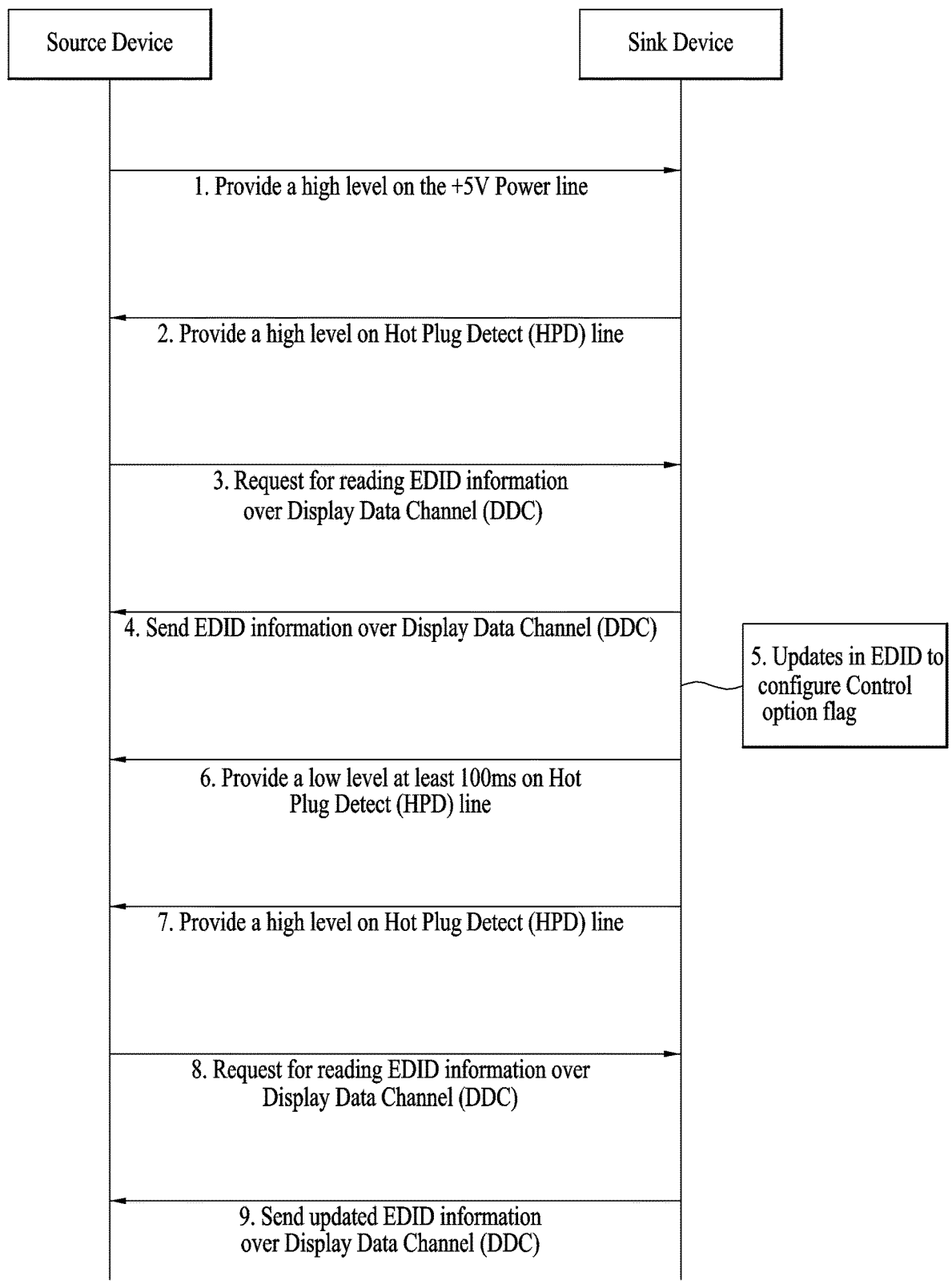

FIG. 3

| | | | | | | | |
|---|---|---|---|---|---|---|---|
| InfoFrame Type Code | colspan="7" | InfoFrame Type = 0×08 (HDR/WCG video InfoFrame) |||||||
| InfoFrame Version Number | colspan="7" | Version = 0×01 |||||||
| Length of InfoFrame | colspan="7" | Length of following InfoFrame ( ) |||||||
| Data Byte 1 (general info) | | | | | | colspan="2" | Frame grouping type ||
| Data Byte 2 (general info) | | | | | Update from previous frame info | Use previous info | Reuse current info | End of HDR/WCG video information |
| Data Byte 3 (input/output video info) | | | | | | | Current video info present | Target info present |
| Data Byte 4 (mapping type) | | | colspan="3" | Dynamic range mapping type ||| colspan="2" | Color mapping type ||
| Data Byte 5 (color space related info) | | colspan="3" | Color precision ||| colspan="3" | Color space type ||| Constant luminance |
| N1 Data Bytes | colspan="7" | Current Video Information (If Current video info present == 1) |||||||
| N2 Data Bytes | colspan="7" | Target video Information (If Target video info present == 1) |||||||
| N3 Data Bytes | colspan="7" | Dynamic Range Mapping Information (Dynamic range mapping type) |||||||
| N4 Data Bytes | colspan="7" | Color Mapping Information (Color mapping type) |||||||

FIG. 4

| InfoFrame Type Code | InfoFrame Type = 0×02 ||||||||
|---|---|---|---|---|---|---|---|---|
| InfoFrame Version Number | Version = 0×02 or [0×03] ||||||||
| Length of AVI InfoFrame | Length of AVI InfoFrame (13) ||||||||
| Data Byte 1 | [Y2] | Y1 | Y0 | A0 | B1 | B0 | S1 | S0 |
| Data Byte 2 | C1 | C0 | M1 | M0 | R3 | R2 | R1 | R0 |
| Data Byte 3 | ITC | EC2 | EC1 | EC0 | Q1 | Q0 | SC1 | SC0 |
| Data Byte 4 | [VIC7] | VIC6 | VIC5 | VIC4 | VIC3 | VIC2 | VIC1 | VIC0 |
| Data Byte 5 | YQ1 | YQ0 | CN1 | CN0 | PR3 | PR2 | PR1 | PR0 |
| Data Byte 6 | ETB07-ETB00 (Line Number of End of Top Bar - lower 8 bits) ||||||||
| Data Byte 7 | ETB15-ETB08 (Line Number of End of Top Bar - upper 8 bits) ||||||||
| Data Byte 8 | SBB07-SBB00 (Line Number of Start of Bottom Bar - lower 8 bits) ||||||||
| Data Byte 9 | SBB15-SBB08 (Line Number of Start of Bottom Bar - upper 8 bits) ||||||||
| Data Byte 10 | ELB07-ELB00 (Pixel Number of End of Left Bar - lower 8 bits) ||||||||
| Data Byte 11 | ELB15-ELB08 (Pixel Number of End of Left Bar - upper 8 bits) ||||||||
| Data Byte 12 | SRB07-SRB00 (Pixel Number of Start of Right Bar - lower 8 bits) ||||||||
| Data Byte 13 | SRB15-SRB08 (Pixel Number of Start of Right Bar - upper 8 bits) ||||||||
| Data Byte 14 (general info) | | | | | Frame grouping type ||||
| Data Byte 15 (general info) | | | | | Update from previous frame info | Use previous info | Reuse current info | End of HDR/WCG video information |
| Data Byte 16 (input/output video info) | | | | | | | Current video info present | Target info present |
| Data Byte 17 (mapping type) | | | | Dynamic range mapping type ||| Color mapping type ||
| Data Byte 18 (color space related info) | | | Color precision ||| Color space type || Constant luminance |
| N1 Data Bytes | Current Video Information (If Current video info present == 1) ||||||||
| N2 Data Bytes | Target video Information (If Target video info present == 1) ||||||||
| N3 Data Bytes | Dynamic Range Mapping Information (Dynamic range mapping type) ||||||||
| N4 Data Bytes | Color Mapping Information (Color mapping type) ||||||||

FIG. 5

| Byte# | bits | | | | | | | |
|---|---|---|---|---|---|---|---|---|
| | 7 | 6 | 5 | 4 | 3 | 2 | 1 | 0 |
| 1 | Tag Code (0×07) | | | | Length of following data block = n bytes | | | |
| 2 | Extended Tag Code (0×07)<br>- HDR/WCG<br>HDR/WCG video information data block | | | | | | | |
| 3 | CS_7 | CS_6 | CS_5 | CS_4 | CS_3 | CS_2 | CS_1 | CS_0 |
| 4 | | | | | | | CL_1 | CL_0 |
| 5 | | | | | | | CInfo | TInfo |
| 6 | DRM_7 | DRM_6 | DRM_5 | DRM_4 | DRM_3 | DRM_2 | DRM_1 | DRM_0 |
| 7 | CM_7 | CM_6 | CM_5 | CM_4 | CM_3 | CM_2 | CM_1 | CM_0 |

FIG. 6

Table 4-6 : Display Parameters Data Block

| Offset | Value | | | | | | | | Description/Format | |
|---|---|---|---|---|---|---|---|---|---|---|
| 00h | 01h | | | | | | | | DISPLAY PARAMETERS DATA BLOCK | TAC |
| 01h | 7 | 6 | 5 | 4 | 3 | 2 | 1 | 0 | BLOCK Revision and Other Data | |
| | _ | _ | _ | _ | _ | 0 | 0 | 0 | REVISION '0' | VALUES 0 → 7 |
| | 0 | 0 | 0 | 0 | 0 | _ | _ | _ | RESERVED | |
| 02h | 0Ch | | | | | | | | Number of Payload Bytes in BLOCK | 12 |
| 03h  04h | DESCRIPTOR | | | | | | | | Horizontal image size | Section 4.2.1 |
| 05h  06h | DESCRIPTOR | | | | | | | | Vertical image size | Section 4.2.1 |
| 07h  08h | DESCRIPTOR | | | | | | | | Horizontal pixel count | Section 4.2.1 |
| 09h  0Ah | DESCRIPTOR | | | | | | | | Vertical pixel count | Section 4.2.3 |
| 0Bh | DESCRIPTOR | | | | | | | | Feature Support Flags | Section 4.2.3 |
| 0Ch | DESCRIPTOR | | | | | | | | Transfer Characteristic Gamma | Section 4.2.4 |
| 0Dh | DESCRIPTOR | | | | | | | | Aspect Ratio | Section 4.2.5 |
| 0Eh | DESCRIPTOR | | | | | | | | Color Bit Depth | Section 4.2.6 |

| Offset | Value | | | | | | | | Description/Format |
|---|---|---|---|---|---|---|---|---|---|
| | 7 | 6 | 5 | 4 | 3 | 2 | 1 | 0 | |
| N | _ | _ | _ | _ | _ | _ | _ | _ | Color space<br>e.g.RGB, XYZ, ACES, L*a*b* |
| N+1 | 0 | 0 | 0 | 0 | 0 | 0 | _ | _ | Constant luminance (CL/non-CL) |
| N+2 | 0 | 0 | 0 | 0 | 0 | 0 | _ | _ | Current/Target info |
| N+3 | _ | _ | _ | _ | _ | _ | _ | _ | Dynamic range mapping<br>e.g.linear, logarithmic function, piecewise curve |
| N+4 | _ | _ | _ | _ | _ | _ | _ | _ | Color mapping<br>e.g.matrix conversion, LUT, adaptive mapping |

FIG. 7

Table 4-285 : Display Device Data Block

| Offset | Value | | | | | | | | Description/Format | |
|---|---|---|---|---|---|---|---|---|---|---|
| 00h | 0Ch | | | | | | | | DISPLAY DEVICE DATA BLOCK | TAG |
| 01h | 7 | 6 | 5 | 4 | 3 | 2 | 1 | 0 | BLOCK Revision and Other Data | |
| | | | | | 0 | 0 | 0 | | REVISION '0' | VALUES 0 → 7 |
| | 0 | 0 | 0 | 0 | 0 | | | | RESERVED | |
| 02h | 0Dh | | | | | | | | Number of Payload Bytes in BLOCK | 13 |
| 03h | DESCRIPTOR | | | | | | | | Display Device Technology | |
| 04h | DESCRIPTOR | | | | | | | | Device operating mode | |
| 05h → 08h | DESCRIPTOR | | | | | | | | Device native pixel format | |
| 09h → 0Ah | DESCRIPTOR | | | | | | | | Aspect ratio and orientation | |
| 0Bh | DESCRIPTOR | | | | | | | | Sub-pixel layout/configuration/shape | |
| 0Ch → 0Dh | DESCRIPTOR | | | | | | | | Horizontal and vertical dot/pixel pitch | |

| Offset | Value | Description/Format |
|---|---|---|
| 0Eh | DESCRIPTOR | Color bit depth |
| 0Fh | DESCRIPTOR | Response time |

| Offset | Value | | | | | | | | Description/Format |
|---|---|---|---|---|---|---|---|---|---|
| | 7 | 6 | 5 | 4 | 3 | 2 | 1 | 0 | |
| N | | | | | | | | | Color space<br>e.g.RGB, XYZ, ACES, L*a*b* |
| N+1 | 0 | 0 | 0 | 0 | 0 | 0 | | | Constant luminance (CL/non-CL) |
| N+2 | 0 | 0 | 0 | 0 | 0 | 0 | | | Current/Target info |
| N+3 | | | | | | | | | Dynamic range mapping<br>e.g.linear, logarithmic function, piecewise curve |
| N+4 | | | | | | | | | Color mapping<br>e.g.matrix conversion, LUT, adaptive mapping |

FIG. 9

| | | | | | | | | |
|---|---|---|---|---|---|---|---|---|
| InfoFrame Type Code | \multicolumn{8}{c}{InfoFrame Type = 0×07} |
| InfoFrame Version number | \multicolumn{8}{c}{Version = 0×01} |
| Length of Info Frame | \multicolumn{8}{c}{Length of following HDR Metadata InfoFrame} |
| Data Byte 1 | F17=0 | F16=0 | F15=0 | F14=0 | F13=0 | \multicolumn{3}{c}{EOTF (3 bits)} |
| Data Byte 2 | F27=0 | F26=0 | \multicolumn{4}{c}{Frame grouping type} | \multicolumn{2}{c}{Static_Metadata_Descriptor ID (3 bits)} |
| Data Byte 3 (general info) | | | | | Update from previous frame info | Use previous info | Reuse current info | End of HDR/WCG video information |
| Data Byte 4 (input/output video info) | | | | | | | Current video info present | Target info present |
| Data Byte 5 (mapping type) | | | \multicolumn{3}{c}{Dynamic range mapping type} | \multicolumn{3}{c}{Color mapping type} |
| Data Byte 6 (color space related info) | | \multicolumn{3}{c}{Color precision} | \multicolumn{3}{c}{Color space type} | Constant luminance |
| N1 Data Bytes | \multicolumn{8}{c}{Current Video Information (If Current video info present == 1)} |
| N2 Data Bytes | \multicolumn{8}{c}{Target video Information (If Target video info present == 1)} |
| N3 Data Bytes | \multicolumn{8}{c}{Dynamic Range Mapping Information (Dynamic range mapping type)} |
| N4 Data Bytes | \multicolumn{8}{c}{Color Mapping Information (Color mapping type)} |

FIG. 10

| InfoFrame Type Code | InfoFrame Type = 0×07 | | | | | |
|---|---|---|---|---|---|---|
| InfoFrame Version number | Version = 0×01 | | | | | |
| Length of Info Frame | Length of following HDR Metadata InfoFrame | | | | | |
| Data Byte 1 | SMD extension flag | F16=0 | F15=0 | F14=0 | F13=0 | EOTF (3 bits) |
| Data Byte 2 | Length of SMD extension (or Length of SMD) | | | | Static_Metadata_Descriptor ID (3 bits) | |
| Data Byte 3 | Static_Metadata_Descriptor | | | | | |
| ... | ... | | | | | |
| Data Byte n | ... | | | | | |
| Data Byte n+1 | SMD extension | | | | | |
| ... | ... | | | | | |

| Data Byte n+1 (general info) | | | | | | | Frame grouping type | |
|---|---|---|---|---|---|---|---|---|
| Data Byte n+2 (general info) | | | | | Update from previous frame info | Use previous info | Reuse current info | HDR/WCG video information |
| Data Byte n+3 (input/output video info) | | | | | | | Current video info present | Target info present |
| Data Byte n+4 (mapping type) | | | | Dynamic range mapping type | | | Color mapping type | |
| Data Byte n+5 (color space related info) | | | Color precision | | | Color space type | | Constant luminance |
| N1 Data Bytes | Current Video Information (If Current video info present == 1) | | | | | | | |
| N2 Data Bytes | Target video Information (If Target video info present == 1) | | | | | | | |
| N3 Data Bytes | Dynamic Range Mapping Information (Dynamic range mapping type) | | | | | | | |
| N4 Data Bytes | Color Mapping Information (Color mapping type) | | | | | | | |

FIG. 12

| InfoFrame Type Code | InfoFrame Type = 0×07 | | | |
|---|---|---|---|---|
| InfoFrame Version number | Version = 0×01 | | | |
| Length of Info Frame | Length of following HDR Metadata InfoFrame | | | |
| Data Byte 1 | F17=0 | F16=0 | Extended_Metadata_Descriptor_ID | EOTF (3 bits) |
| Data Byte 2 | F27=0 | Frame grouping type | HDR/WCG video info Present flag | Static_Metadata_Descriptor ID (3 bits) |
| Data Byte 3 | Static_Metadata_Descriptor | | | |
| ... | ... | | | |
| Data Byte n | ... | | | |

| InfoFrame Type Code | InfoFrame Type = 0×08 (HDR/WCG video InfoFrame) | | | | | | | |
|---|---|---|---|---|---|---|---|---|
| InfoFrame Version number | Version = 0×01 | | | | | | | |
| Length of InfoFrame | Length of following InfoFrame ( ) | | | | | | | |
| Data Byte 1 (general info) | Extended_Metadata_Descriptor ID | | | | Frame grouping type | | | |
| Data Byte 2 (general info) | | | | Update on Dynamic Range and Mastering InfoFrame flag | Update from previous frame info | Use previous info | Reuse current info | End of HDR/WCG video information |
| Data Byte 3 (input/output video info) | | | | | | | Current video info present | Target info present |
| Data Byte 4 (mapping type) | | | Dynamic range mapping type | | | Color mapping type | | |
| Data Byte 5 (color space related info) | | Color precision | | | Color space type | | | Constant luminance |
| N1 Data Bytes | Current Video Information (If Current video info present == 1) | | | | | | | |
| N2 Data Bytes | Target video Information (If Target video info present == 1) | | | | | | | |
| N3 Data Bytes | Dynamic Range Mapping Information (Dynamic range mapping type) | | | | | | | |
| N4 Data Bytes | Color Mapping Information (Color mapping type) | | | | | | | |

FIG. 13

| Byte# | bits | | | | | | | |
|---|---|---|---|---|---|---|---|---|
| | 7 | 6 | 5 | 4 | 3 | 2 | 1 | 0 |
| 1 | Tag Code (0×07) | | | Length of following data block = n bytes | | | | |
| 2 | Extended Tag Code (0×06) | | | | | | | |
| 3 | F37=0 | F36=0 | ET_5 | ET_4 | ET_3 | ET_2 | ET_1 | ET_0 |
| 4 | SM_7 | SM_6 | SM_5 | SM_4 | SM_3 | SM_2 | SM_1 | SM_0 |
| 5 | Desired Content Max Luminance data (8 bits) | | | | | | | |
| 6 | Desired Content Max Frame-average Luminance data (8 bits) | | | | | | | |
| 7 | Desired Content Min Luminance data (8 bits) | | | | | | | |

| | 7 | 6 | 5 | 4 | 3 | 2 | 1 | 0 |
|---|---|---|---|---|---|---|---|---|
| 8 | CS_7 | CS_6 | CS_5 | CS_4 | CS_3 | CS_2 | CS_1 | CS_0 |
| 9 | | | | | | | CL_1 | CL_0 |
| 10 | | | | | | | CInfo | TInfo |
| 11 | DRM_7 | DRM_6 | DRM_5 | DRM_4 | DRM_3 | DRM_2 | DRM_1 | DRM_0 |
| 12 | CM_7 | CM_6 | CM_5 | CM_4 | CM_3 | CM_2 | CM_1 | CM_0 |
| 13 | EM_7 | EM_6 | EM_5 | EM_4 | EM_3 | EM_2 | EM_1 | EM_0 |

FIG. 14

| Byte# | bits | | | | | | | |
|---|---|---|---|---|---|---|---|---|
| | 7 | 6 | 5 | 4 | 3 | 2 | 1 | 0 |
| 1 | Tag Code (0×07) | | | Length of following data block = n bytes | | | | |
| 2 | Extended Tag Code (0×07) - HDR/WCG video information data block | | | | | | | |
| 3 | CS_7 | CS_6 | CS_5 | CS_4 | CS_3 | CS_2 | CS_1 | CS_0 |
| 4 | DRMI reg | | | | | | CL_1 | CL_0 |
| 5 | | | | | | | CInfo | TInfo |
| 6 | DRM_7 | DRM_6 | DRM_5 | DRM_4 | DRM_3 | DRM_2 | DRM_1 | DRM_0 |
| 7 | CM_7 | CM_6 | CM_5 | CM_4 | CM_3 | CM_2 | CM_1 | CM_0 |
| 8 | EM_7 | EM_6 | EM_5 | EM_4 | EM_3 | EM_2 | EM_1 | EM_0 |

FIG. 15

| | | | | | | | |
|---|---|---|---|---|---|---|---|
| InfoFrame Type Code | colspan="7" | InfoFrame Type = 0×08 (HDR/WCG video InfoFrame) |
| InfoFrame Version Number | colspan="7" | Version = 0×01 |
| Length of Info Frame | colspan="7" | Length of following InfoFrame ( ) |
| Data Byte 1 (general info) | colspan="3" | Extended_Metadata_Descriptor ID | colspan="4" | Frame grouping type |
| Data Byte 2 (general info) | multiple info flag | | | Update on Dynamic Range and Mastering InfoFrame flag | Update from previous frame info | Cancel previous info | Reuse current info | End of HDR/WCG video information |
| Data Byte 3 (input/output video info) | | | | | Local feature info present | Current video info present | Target info present |
| Data Byte 4 (mapping type) | | | colspan="3" | Dynamic range mapping type | colspan="3" | Color mapping type |
| Data Byte 5 (color space related info) | | colspan="3" | Color precision | colspan="3" | Color space type | Constant luminance |
| Data Byte 6-7 (multiple info description) | | | | multiple target flag | multiple method flag | multiple local feature flag | multiple view flag |
| | | | | colspan="4" | Number of information sets |
| Data Byte 8 | colspan="7" | Length of information set A |
| N0-A Data Bytes (options for metadata set A) | exclusive info flag | subset existence flag | colspan="2" | Total number of subsets | colspan="3" | Subset number |
| | | | colspan="6" | information type |
| N1-A Data Bytes | colspan="7" | Current Video Information (If Current video info present == 1) |
| N2-A Data Bytes | colspan="7" | Target video Information (If Target video info present == 1) |
| N3-A Data Bytes | colspan="7" | Dynamic Range Mapping Information (Dynamic range mapping type) |
| N4-A Data Bytes | colspan="7" | Color Mapping Information (Color mapping type) |
| N5-A Data Bytes | colspan="7" | Local feature information (if local feature info present == 1) |
| | colspan="7" | ... |
| Data Byte | colspan="7" | Length of information set X |
| N0-X Data Bytes (options for metadata set X) | exclusive info flag | subset existence flag | colspan="2" | Total number of subsets | colspan="3" | Subset number |
| N1-X Data Bytes | colspan="7" | Current Video Information (If Current video info present == 1) |
| N2-X Data Bytes | colspan="7" | Target video Information (If Target video info present == 1) |
| N3-X Data Bytes | colspan="7" | Dynamic Range Mapping Information (Dynamic range mapping type) |
| N4-X Data Bytes | colspan="7" | Color Mapping Information (Color mapping type) |
| N5-X Data Bytes | colspan="7" | Local feature information (if local feature info present == 1) |

FIG. 16

| Byte# | bits | | | | | | | |
|---|---|---|---|---|---|---|---|---|
| | 7 | 6 | 5 | 4 | 3 | 2 | 1 | 0 |
| 1 | Tag Code (0×07) | | | | Length of following data block = n bytes | | | |
| 2 | Extended Tag Code (0×07) - HDR/WCG video information data block | | | | | | | |
| 3 | CS_7 | CS_6 | CS_5 | CS_4 | CS_3 | CS_2 | CS_1 | CS_0 |
| 4 | DRMI_reg | | | | | | CL_1 | CL_0 |
| 5 | | | | | | | CInfo | TInfo |
| 6 | DRM_7 | DRM_6 | DRM_5 | DRM_4 | DRM_3 | DRM_2 | DRM_1 | DRM_0 |
| 7 | CM_7 | CM_6 | CM_5 | CM_4 | CM_3 | CM_2 | CM_1 | CM_0 |
| 8 | EM_7 | EM_6 | EM_5 | EM_4 | EM_3 | EM_2 | EM_1 | EM_0 |
| 9 | | | | | Multi_EM_3 | Multi_EM_2 | Multi_EM_1 | Multi_EM_0 |

FIG. 19

| | | | | | | |
|---|---|---|---|---|---|---|
| InfoFrame Type Code | InfoFrame Type = 0x08 (color volume InfoFrame) | | | | | |
| InfoFrame Version Number | Version = 0 × 01 | | | | | |
| Length of InfoFrame | Length of following InfoFrame ( ) | | | | | |
| Data Byte 1 | information type | Update from previous frame info | Cancel previous info | Reuse current info | End of video Information | |
| Data Byte 2 | color volume type | Color space type | | | linear representation | |
| Data Byte 3 | transfer function type | recommended inverse transfer function type | | | | |
| Data Bytes | color volume descriptor (color volume type) | | | | | |

FIG. 20

| 1 Data Byte | color gamut type |
|---|---|
| 4 Data Bytes | minimum luminance value |
| 4 Data Bytes | maximum luminance value |
| 4 Data Bytes | maximum target luminance value |

FIG. 21

| Data Byte N | total number of luminance ranges = L |
|---|---|
| Data Byte N+1 - N+5 | luminance value 1 |
| Data Byte N+6 | total number of points for level 1 = M1 |
| Data Byte N+7 – N+9 | color coordinate a 1 |
| Data Byte N+10 – N+12 | color coordinate b 1 |
|  | …. |
| 3 Data Bytes | color coordinate a M1 |
| 3 Data Bytes | color coordinate b M1 |
|  | … |
| 4 Data Bytes | luminance value L |
| 1 Data Bytes | total number of points for level 1 = M_L |
| 3 Data Bytes | color coordinate a 1 |
| 3 Data Bytes | color coordinate b 1 |
|  | …. |
| 3 Data Bytes | color coordinate a M_L |
| 3 Data Bytes | color coordinate b M_L |

FIG. 22

| | |
|---|---|
| 1 Data Byte | total number of color representations = L |
| 1 Data Byte | 1st color representation type |
| 1 Data Byte | number of primaries (first color representation) = M_1 |
| 3 Data Bytes | color coordinate a 1 |
| 3 Data Bytes | color coordinate b 1 |
| 4 Data Bytes | minimum value 1 |
| 4 Data Bytes | maximum value 1 |
| | …. |
| 3 Data Bytes | color coordinate a M_1 |
| 3 Data Bytes | color coordinate b M_1 |
| 4 Data Bytes | minimum value M_1 |
| 4 Data Bytes | maximum value M_1 |
| | …. |
| 1 Data Byte | L th color representation type |
| 1 Data Byte | number of primaries (L th color representation) = M_L |
| 3 Data Bytes | color coordinate a 1 |
| 3 Data Bytes | color coordinate b 1 |
| 4 Data Bytes | minimum value 1 |
| 4 Data Bytes | maximum value 1 |
| | …. |
| 3 Data Bytes | color coordinate a M_L |
| 3 Data Bytes | color coordinate b M_L |
| 4 Data Bytes | minimum value M_L |
| 4 Data Bytes | maximum value M_L |

FIG. 23

| Static_Metadata_Descriptor_ID | Metadata Descriptor |
|---|---|
| 0 | Static Metadata Type 1 |
| 1-7 | Reserved for future use |

| 1 | HDR/WCG video information metadata type |
| 2 | color volume |
| 3-7 | Reserved for future use |

| InfoFrame Type Code | InfoFrame Type = 0x07 | | | | | | |
|---|---|---|---|---|---|---|---|
| InfoFrame Version Number | Version = 0x01 | | | | | | |
| Length of InfoFrame | Length of followin HDR Metadata InfoFrame | | | | | | |
| Data Byte 1 | F17 = 0 | F16 = 0 | F15 = 0 | F14 = 0 | F13 = 0 | EOTF (3bits) | | |
| Data Byte 2 | F27 = 0 | F26 = 0 | F25 = 0 | F24 = 0 | F23 = 0 | Static_Metadata_Descriptor ID (3bits) | | |
| Data Byte 3 | information type | | | Update from previous frame info | Cancel previous info | Reuse current info | End of video Information |
| Data Byte 4 | color volume type | | | | Color space type | | |
| Data Byte 5 | transfer function type | | | | recommended inverse transfer function type | | linear representation |
| Data Bytes | color volume descriptor (color volume type) | | | | | | |

| Byte # | bits | | | | | | | |
|---|---|---|---|---|---|---|---|---|
| | 7 | 6 | 5 | 4 | 3 | 2 | 1 | 0 |
| 1 | Tag Code (0 × 07) | | | Length of following data block = n bytes | | | | |
| 2 | Extended Tag Code (0 × 08) – color volume information data block | | | | | | | |
| 3 | CV_7 | CV_6 | CV_5 | CV_4 | CV_3 | CV_2 | CV_1 | CV_0 |
| 4 | CS_7 | CS_6 | CS_5 | CS_4 | CS_3 | CS_2 | CS_1 | CS_0 |
| 5 | RIT_7 | RIT_6 | RIT_5 | RIT_4 | RIT_3 | RIT_2 | RIT_1 | RIT_0 |

DATA PROCESSING METHOD AND DEVICE FOR ADAPTIVE IMAGE PLAYING

CROSS REFERENCE TO RELATED APPLICATIONS

This application is the National Phase of PCT International Application No. PCT/KR2017/011302, filed on Oct. 13, 2017, which claims priority under 35 U.S.C. 119(e) to U.S. Provisional Application No. 62/408,082, filed on Oct. 14, 2016, all of which are hereby expressly incorporated by reference into the present application.

TECHNICAL FIELD

The present invention relates to a data processing method and apparatus for adaptive image playing.

BACKGROUND ART

As analog broadcast signal transmission has been terminated, various technologies for transmitting and receiving digital broadcast signals have been developed. The digital broadcast signals may include video/audio data more than those of analog broadcast signals, and may further include a variety of additional data as well as the video/audio data.

UHD broadcasting aims to provide enhanced video quality and immersiveness to viewers in various aspects as compared with the existing HD broadcasting. As one of methods for this aim, it is expected that a method for extending a range of luminance and color expressed by contents to a range of luminance and color capable of being recognized in an actual visual system will be introduced in UHD. That is, it is expected that HDR (high dynamic range) and WCG (wide color gamut) will be introduced. That is, as enhanced high-contrast image and color are provided by the contents, users who watch UHD contents experience the higher immersiveness and reality. The present invention suggests a method for effectively playing image luminance and color in accordance with a producer's intention when contents are played by a display, whereby a viewer can view an image of more enhanced picture quality.

DISCLOSURE

Technical Problem

Studies for a method for defining a color volume will be required.

Studies for a method for delivering information on a color volume from a source device to a sink device will be required.

Studies for a method for delivering information on a color volume from a sink device to a source device will be required.

Technical Solution

In the present invention, a color volume may be defined through color gamut, luminance range, luminance level, color space, color plane and/or color boundary.

In the present invention, a configuration of an InfoFrame may be defined to deliver information on a color volume to a sink device.

In the present invention, a configuration of EDID may be defined to deliver information on a color volume to a source device.

Advantageous Effects

The present invention may provide a method for defining a color volume.

The present invention may provide a method for delivering information on a color volume to a sink device.

The present invention may provide a method for delivering information on a color volume to a source device.

BRIEF DESCRIPTION OF THE DRAWINGS

FIG. 2 is a flowchart illustrating information exchange between a source device and a sink device according to an embodiment of the present invention.

FIG. 3 illustrates InfoFrame including dynamic range information and color gamut information according to an embodiment of the present invention.

FIG. 4 illustrates InfoFrame including dynamic range information and color gamut information according to another embodiment of the present invention.

FIG. 5 illustrates a method of delivering display related information using extended display identification data according to an embodiment of the present invention.

FIG. 6 illustrates a method of delivering display related information using extended display ID according to another embodiment of the present invention.

FIG. 7 illustrates a method of delivering display related information using extended display ID according to another embodiment of the present invention.

FIG. 9 illustrates a method of extending a static metadata descriptor ID and delivering video information to a sink device according to an embodiment of the present invention.

FIG. 10 illustrates a method of extending a static metadata descriptor ID and delivering video information to a sink device according to another embodiment of the present invention.

FIG. 12 illustrates a method of defining separate InfoFrame for video information according to an embodiment of the present invention.

FIG. 13 illustrates a method of delivering sink device information to a source device according to an embodiment of the present invention.

FIG. 14 illustrates a method of delivering sink device information to a source device according to an embodiment of the present invention.

FIG. 15 illustrates a method of defining separate InfoFrame for video information according to an embodiment of the present invention.

FIG. 16 illustrates a method of delivering multiple pieces of information of a sink device to a source device according to an embodiment of the present invention.

FIG. 19 illustrates a structure of a color volume InfoFrame according to one embodiment of the present invention.

FIG. 20 illustrates a configuration of a color volume descriptor according to one embodiment of the present invention.

FIG. 21 illustrates a configuration of a color volume descriptor according to another embodiment of the present invention.

FIG. 22 illustrates a configuration of a color volume descriptor according to still another embodiment of the present invention.

FIG. 23 illustrates a configuration of a Dynamic Range and Mastering InfoFrame according to one embodiment of the present invention.

BEST MODE FOR CARRYING OUT THE INVENTION

Figure 1:
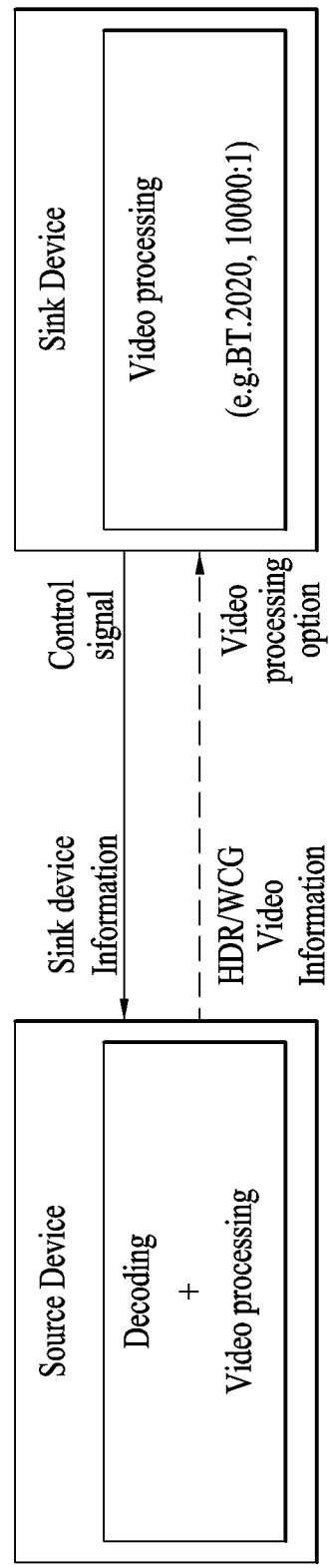
FIG. 1 illustrates a method of delivering information between a source device and a sink device according to an embodiment of the present invention.

The present invention provides a method for converting and presenting content as images with enhanced video quality by transmitting, to a receiver, a factor which can adaptively adjust the content for characteristics of various scenes included in the content when high dynamic range (HDR) content which can be represented in a wide range of luminance is provided. UHD broadcast can be discriminated from conventional broadcast and can provide high level of presence by representing luminance which cannot be expressed in conventional content. As a dynamic range of images increases according to introduction of HDR (high dynamic range), a characteristic difference between scenes included in content may increase. Accordingly, a broadcast transmission device can additionally provide information for effectively displaying characteristics of each scene on a display and a reception device can present images through a method suitable for a producer's intention by providing video effects on the basis of the transmitted information.

UHD broadcast can provide enhanced video quality and immersiveness to viewers through various methods compared to RD broadcast. As one such method, UHD broadcast can provide a method of extending ranges of representation of luminance and color expressed in content to luminance and color recognition ranges which can be recognized by the human visual system. That is, HDR (high dynamic range) and WCG (wide color gamut) can be applied to UHD content. That is, content with enhanced contrast and colors is provided such that a UHD content user can experience improved immersiveness and presence. The present invention provides a method for effectively presenting luminance and color of images of content depending on intention of a producer when the content is presented through a display such that a user can view images with enhanced video quality.

Presence and immersiveness which can be provided by UHDTV provide enhanced viewer experiences in various storage media and services as well as broadcast and thus receive attention. To provide UHD content discriminated from previous video content and the same experiences as user experiences of acquiring information through actual visual recognition instead of viewing images through screens, a color gamut and a dynamic range as well as a large screen become important. To this end, while video enhancement algorithms are developed and standardized and research on display manufacturing is conducted, various display characteristics need to be supported for settling services after initiation thereof. To view UHD content, an external device connected to a UHD display, such as an STB or a Blu-ray disc player, or an external device for supporting more enhanced video processing performance than the UHD display may be used. The present invention proposes a signaling method for overcoming the limits of interfaces which connect a display and an external device to correctly deliver information about display performance and characteristics to external devices such that the external devices perform content conversion adapted to display characteristics, providing an environment in which viewers can view UHD content in an optimal environment.

The present invention provides a method of delivering information between a display device (referred to as a sink device hereinafter) and an external device (referred to as a source device hereinafter) connected to the display device. That is, the sink device may deliver characteristics thereto to the source device, and the source device may deliver information about adaptive content conversion to the sink device. Accordingly, the sink device can adaptively convert content delivered from the source device thereto to provide images with enhanced video quality to users.

FIG. 1 illustrates a method of delivering information between a source device and a sink device according to an embodiment of the present invention. In the present invention, the source device may perform video decoding and video processing and the sink device may perform video processing and video output. For example, the source device may be a device which performs decoding and video processing on video signals received through various paths such as broadcast, storage media such as Blu-ray disc (BD)/UV/SCSA and IP streaming. Specific examples of the source device include a set top box (STB), BD/UV/SCSA player, PC, etc. Here, video processing of the source device may include video processing for video enhancement such as WCG and HDR.

The source device may perform video processing on the basis of sink device information delivered from the sink device. The sink device information may include display related information of the sink device, for example, information about color gamut or dynamic range. In this case, the source device can provide picture quality suitable for display characteristics of the sink device on the basis of the sink device information. To this end, the sink device may provide display metadata to the source device. Here, the display metadata may include the aforementioned display related information of the sink device. In addition, the source device may provide metadata of a finally output image. The metadata of the output image may include video information applied to video processing, for example, information related to HDR and WCG.

The aforementioned video processing may be performed in the sink device according to an embodiment. This can be applied when the video processing performance provided by the sink device is higher than that of the source device. In this case, the source device can deliver information necessary for video processing, for example, HDR and WCG related information and information about video processing operations to the sink device. A description will be given of information exchange between the source device and the sink device.

FIG. 2 is a flowchart illustrating information exchange between the source device and the sink device according to an embodiment of the present invention. The figure shows a method of exchanging information through an HDR data block included in extended display identification data (EDID) when the source device and the sink device are connected through a wired interface (e.g., HDMI or a display port). That is, the figure shows a method through which the source device reads changed EDID of the sink device when the sink device activates or deactivates HDR and WCG functions of the source device. When the source device is connected to the sink device through the wired interface, the source device may provide a high level voltage on a +5V power line of the wired interface (step 1). Accordingly, the sink device can confirm connection of the source device. Then, the sink device may provide a high level voltage on a hot plug detect (HPD) line maintained at a low level voltage (step 2). Accordingly, the sink device notifies the source device that connection is completed and reading of EDID is ready. The source device may check transition of the HPD line to a high level and deliver a request for reading EDID information to the sink device over a display data channel (DDC) (step 3). In response to this, the sink device may send EDID information over the DDC (step S4). Thereafter, a control option flag of an HDR data block of the EDID may be changed at the request of a user or according to functional determination of the sink device (step 5). In this case, the sink device may provide a low level voltage on the HPD line for at least 100 ms in order to notify the source device of EDID update (step 6). When the sink device can read the EDID, the sink device may apply a high level voltage to the HPD line (step 7). The source device detects application of the high level voltage and may make a request to read EDID over the DDC (step 8). The sink device may send the updated EDID information over the DDC (step 9).

Next, a method of exchanging information necessary for video processing for video enhancement between the source device and the sink device will be described using the aforementioned flowchart.

According to an embodiment of the present invention, the source device may deliver a request for display metadata in the aforementioned step 3 or 8 and the sink device may send the display metadata to the source device in step 4 or 9. Here, the display metadata may include information about a color gamut and brightness of the sink device. Color gamut information may include information about color primary coordinates on a CIE xy diagram of colors corresponding to RGBW or a standard color gamut such as BT.709 and BT.2020. Such display metadata may be delivered through a color characteristics data block of a display ID (DisplayID). Brightness related information corresponds to maximum and minimum brightness values and may be delivered through a data block defined in DisplayID, EDID, EDID extension and the like.

The source device may determine whether color and brightness information of video content needs to be adjusted on the basis of the delivered display metadata. When color and brightness need to be adjusted, the source device delivers necessary information along with decoded video to the sink device. Here, color gamut and dynamic range related metadata about the video may be delivered through AVI InfoFrame and dynamic range and mastering InfoFrame.

When color mapping and dynamic range mapping are dynamically applied to each scene or frame, the source device needs to deliver information corresponding to each decoded scene or frame. Here, an interface standard for delivering a corresponding scene is needed, and the method described in the present invention can be used. The delivered information may include not only detailed information about color mapping and dynamic range mapping but also video format information before mapping and video format information targeted after mapping. In addition, the source device may deliver information indicating whether information has been updated from a previous frame (update from previous frame info), information indicating whether previous information is used (cancel previous info), information indicating whether the current information will be reused in the future (reuse current frame info), information indicating end of information per scene or frame (end of additional HDR video information), etc.

The sink device may perform video processing adapted for a scene and a frame on the basis of the video format information, color mapping information and dynamic range mapping information delivered from the source device. Here, the sink device may separately include a part for processing the corresponding information or process the corresponding information using a block included therein.

If feedback for a processing procedure between the source device and the sink device is required, feedback may be controlled through the control option flag.

A description will be given of an embodiment in which the source device delivers information necessary for video processing to the sink device.

In the present invention, information delivered from the source device to the sink device is additional information about HDR/WCG factors of UHD content. Although the present invention is focused on delivery of information about HDR/WCG factors of UHD content, general information about UHD may be delivered. To deliver information from the source device to the sink device, the information may be delivered in the form of InfoFrame. In this case, new InfoFrame may be defined, previously defined AVI InfoFrame may be extended, or dynamic range and mastering InfoFrame may be extended to deliver additional information about HDR/WCG factors of UHD content from the source device to the sink device. A description will be given of an embodiment in which new InfoFrame is defined.

FIG. 3 illustrates InfoFrame including dynamic range information and color gamut information according to an embodiment of the present invention. In the present invention, the source device may deliver information to the sink device through newly defined InfoFrame. Here, the information delivered to the sink device may include information used for the sink device to accurately process HDR/WCG video. For example, the information may include processing information suitable for change over time in content, such as a scene or a frame. In the embodiment, information related to dynamic range mapping and color mapping is exemplified. Here, the information delivered from the source device to the sink device may additionally include video format information before and after video processing and may further include information about a color space in which mapping is performed and information for indicating whether information has been updated.

In the figure, InfoFrameType indicates the type of InfoFrame defined to provide additional information about HDR/WCG video. In the present embodiment, 0x08 can be allocated to InfoFrameType to represent that HDR video related additional information is provided.

Frame grouping type information indicates an HDR/WCG video information application unit. HDR/WCG video information can be applied on a scene-by-scene basis, a video clip-by-video clip basis or a frame-by-frame basis. The unit defined by this information can represent an application unit of information in InfoFrame proposed by the present invention. For example, when the frame grouping type information is set to 000 to designate a scene as a unit, the frame grouping type information can represent that target video information is equally applied in a specific scene. The frame grouping type information may represent application of HDR/WCG video information in units of scene when set to 000, in units of video clip when set to 001, in units of frame when set to 010, and in units of content when set to 011. Values from 100 to 111 may be reserved for future use. The frame grouping type information may be included in data byte 1 of HDR/WCG video InfoFrame.

Data byte 2 of the HDR/WCG video InfoFrame may include Update from Previous Frame Info, Cancel Previous Info, Reuse Current Info and End of HDR/WCG Video information.

Update from Previous Frame Info indicates whether there is an update from previous information when HDR/WCG video InfoFrames are continuously provided. For example, when the frame grouping type indicates a scene type, Update from Previous Frame Info can indicate whether information applied to the current scene has been updated from information applied to a previous scene. This information indicates update in an HDR/WCG video InfoFrame when set to 1 such that the following information in the HDR/WCG video InfoFrame is referred to. In addition, this information indicates that previously provided information can be used when set to 0. For example, when the frame grouping type indicates a scene type, this information can indicate that information applied to a previous scene can be applied to the current scene. Update from Previous Frame Info may be interpreted in association with the frame grouping type information. For example, even if the frame grouping type information indicates a frame type, every frame is not always updated. Accordingly, Update from Previous Frame Info may be subdivided and used.

Cancel Previous Info indicates whether previous information is used. This information indicates that corresponding information is not used when set to 1. For example, this information can indicate that information included in HDR/WCG video InfoFrame of a previous frame is not used when set to 1. That is, this information may be used to refresh HDR/WCG video InfoFrame. This information indicates that previous information can be used when set to 0. For example, when various types of HDR/WCG video information are provided, a case in which previous information is stored in a specific space and used may be considered. In this case, this information may be used for an operation of removing all of previous information and using only currently provided information. This field may be interpreted in association with the frame grouping type. For example, when the frame grouping type is a scene type and there is a scene change, this information can be used to indicate the scene change because information discriminated from previous information needs to be used.

Reuse Current Frame Info indicates whether information provided for the current frame can be used for a neighboring frame or can be used only for the current frame. This information may indicate that information provided for the current frame can be used in consecutive frames when set to 1. When a method of providing no additional information for consecutive frames on the basis of Reuse Current Frame Info is used, a data rate may be increased. On the other hand, this information indicates that information provided for the current frame can be used only for the current frame when set to 0. This field may be interpreted in association with the frame grouping type.

End of HDR/WCG Video information indicates end of HDR/WCG video information. For example, this information can indicate that corresponding InfoFrame is not used for frames provided when a program using the corresponding InfoFrame ends. In addition, this information may be used to indicate end/transition of a program or end of HDR/transition from HDR to standard dynamic range (SDR).

Data byte 3 of HDR/WCG video InfoFrame may include Current Video Info Present and Target Info Present.

Current Video Info Present indicates whether video information about the current frame is provided. When this information is 1, InfoFrame can provide detailed information through current video information included in N1 data bytes. The detailed information about the current video provided through the current video information may include information related to a dynamic range and a color gamut. For example, the current video information may include a subblock length and information of data bytes 0 to n+10. In the current video information, data byte n may include a white level, data byte n+1 may include a black level, and data bytes n+2, n+3, n+4, n+5, n+6 and n+7 may include Red-x, Red-y, Green-x, Green-y, Blue-x and Blue-y information, respectively. In addition, data bytes n+8 and n+9 may include white-x and white-y information and data byte n+10 may include precision information.

The white level is information used to indicate a dynamic range of video and represents a maximum luminance value. Here, luminance may represent physical luminance or may refer to maximum luminance relative to black, a maximum value in code values, or the like. When such meanings need to be used in a discriminative manner, types may be defined for respective meanings or values therefor may be separately defined and used.

The black level is contrast to the white level and refers to a minimum value in a dynamic range. The black level may represent different meanings like the white level, and when all the different meanings need to be represented, the meanings may be additionally defined and used.

In addition to the method of signaling HDR video properties through white/black levels as described in the above example, HDR video properties may be signaled through predefined HDR division in such a manner that DR characteristics of video are divided in stages according to f-stop. Further, a transfer function used to encode HDR video, for example, EOTF (electro-optical transfer function (gamma function or the like)) may be additionally signaled.

Red-x/-y, Green-x/-y and Blue-x/-y represent x and y color coordinates for indicating a color gamut. This information may represent arbitrary coordinates as in the example of the present invention, and in the case of a standard color gamut or a widely used color gamut, the color gamut may be signaled using a predetermined value.

White-x/-y represents color coordinates for indicating a white point. This information may represent arbitrary coordinates as in the example of the present invention. A standard white point or a widely used white point may be signaled using a predetermined value.

Additionally, information about a color volume used to encode colors of content may be additionally defined.

The Target Video Info Present indicates information about a result which is a target of video enhancement and video change of a corresponding frame/scene through HDR/WCG video InfoFrame. Here, the target may be a video format or a display. If it is necessary to set different targets for video and a display, the Target Video Info Present can be differently defined therefor. When this field is 1, detailed information may be provided through target video information. Detailed information about target video provided through the target video information may include dynamic range and color gamut related information. For example, the target video information may include a subblock length and data bytes n to n+9. Data byte n of the target video information may indicate a white level, data byte n+1 may indicate a black level, and data bytes n+2, n+3, n+4, n+5 and n+6 and n+7 may indicate Red-x, Red-y, Green-x, Green-y, Blue-x and Blue-y. In addition, data bytes n+8 and n+9 may indicate white-x and white-y. Definition and detailed description of each piece of information may comply with the above description of the current video information.

A color space type may represent a color space which is a basis of dynamic range mapping and color mapping processes. For example, the color space type may designate RGB, YCbCr, XYZ or ACES as a color space. That is, the color space type may indicate RGB when set to 000, indicate XYZ when set to 001, indicate ACES when set to 010 and indicate L*a*b* when set to 011.

Constant luminance represents whether a process which is a basis of dynamic range mapping and color mapping corresponds to constant luminance or non-constant luminance. Here, definition of constant luminance conforms to BT.2020 of ITU-R. This information may be set to represent constant luminance when set to 1.

In addition, a field for identifying an HDR/WCG video information type when there are multiple pieces of HDR/WCG video information, a method and a field for, when HDR/WCG video information is applied differently according to regions, recognizing HDR/WCG video information for each region, a method of designating a process order, and signaling for association with dynamic range and mastering InfoFrame may be added.

Color precision represents precision of color expression and may be used in association with the aforementioned color space type as necessary. For example, in the case of RGB, even the same color can be expressed with different precisions such as 10 bits/12 bits/14 bits. Further, color precision may be represented using a floating point.

A dynamic range mapping type indicates a type of a tone mapping method provided through HDR/WCG InfoFrame. There are various tone mapping methods, such as a linear function, a look-up table (LUT), a logarithmic function and a piecewise curve, and detailed information may be provided through dynamic range mapping information according to type. Here, dynamic range mapping refers to processing related to luminance and may include processing procedures such as a transfer curve and dynamic range compression/extension. The dynamic range mapping type may represent that there is no mapping when set to 000, represent that a linear function is used as a tone mapping method when set to 001, represent that a logarithmic function is used as a tone mapping method when set to 010, represent that an exponential function is used as a tone mapping method when set to 011, represent that an S-curve is used as a tone mapping method when set to 100, represent that a piecewise curve is used as a tone mapping method when set to 101 and represent an LUT when set to 110.

An embodiment using an LUT will be described. An LUT is a table for matching input values with output values and may be regarded as a set of a specific number of points (e.g., 32 points). When the dynamic range mapping type represents an LUT, the dynamic range mapping type may include a subblock length and data bytes n to n+2N+1. Data byte n of the dynamic range mapping information may include an LUT type and an LUT interpolation type. Data byte n+1 may include information about the number of points, data byte n+2 may include information about input sample 1, data byte n+3 may include information about output sample 1, data byte n+4 may include information about input sample 2, data byte n+5 may include information about output sample 2, data byte n+2N may include information about input sample N and data byte n+2N+1 may include information about output sample N. Here, the LUT type may be represented as an LUT dimension and indicates the dimension of the LUT. The LUT dimension may indicate a 1-dimensional LUT (1D LUT) when the LUT type is 00 and indicate a 3-dimensional LUT (3D LUT) when the LUT type is 01. The aforementioned LUT indicates an example of a 1D LUT.

An LUT interpolation type may be used to designate an input/output sample interpolation method.

Number of Points may be used to indicate the number of input/output samples. When Number of Points is 10 bits, this indicates a value in the range of 2 to 1023.

A description will be given of an embodiment with respect to a piecewise curve type. As a method for dynamic range mapping, a piecewise curve which applies different curves to a plurality of pieces may be considered. Here, input/output values for designating each piece are necessary to designate a curve suitable for each piece and a coefficient according thereto. When the dynamic range mapping type is a piecewise curve, dynamic range mapping information (tone mapping information) may include a subblock length and data bytes n to n+4N+2. Data byte n of the dynamic range mapping information may include Number of Points. In addition, data byte n+1 may include information about a 0-th curve type, data byte n+2 may include information about a 0-th coefficient, data byte n+3 may include information about a first input, data byte n+4 may include information about a first output, data byte n+5 may include information about a first curve type, data byte n+6 may include information about a first coefficient, data byte n+4N−1 may include information about an N-th input, data byte n+4N may include information about an N-th output, data byte n+4N+1 may include information about an N-th curve type, and data byte n+4N+2 may include information about an N-th coefficient. Number of Points represents the number of input/output samples. In the aforementioned embodiment, a case in which N sample points are provided is considered, which represents a function composed of N+1 pieces. A curve type represents a type of a piecewise curve. Various curves such as a linear function, a step function, a logarithmic function, an exponential function and an m-order function may be predetermined.

Coefficients represent coefficients according to curve types. For example, it is necessary to deliver information about an order with respect to a curve of an m-order function type, and information about a base may be delivered through coefficients with respect to a curve of a logarithmic function.

A color mapping type represents a type of color mapping method provided through HDR/WCG InfoFrame. A method such as a matrix and a look-up table may be used and detailed information may be provided through color mapping information according to type thereof. Color mapping refers to processing related to chrominance and may include gamut shaping or gamut mapping with respect to a color gamut. The color mapping type may represent that there is no mapping when set to 000, represent that a gain-offset is used when set to 001, represent that matrix conversion is used when set to 010, represent that an LUT is used when set to 011, and represent that an advanced mapping method is used when set to 100. Although it is assumed that dynamic range mapping and color mapping are performed as separate processes in the present invention, the two processes may be performed as one process, and in this case, the dynamic range mapping type and the color mapping type may be provided as a single piece of information instead of separate pieces of information. That is, the dynamic range mapping type and the color mapping type may be signaled through a single piece of information.

In the following, a method using matrix conversion will be described as a color mapping method. In this case, the number of columns, the number of rows and coefficients of a matrix may be delivered. For example, color mapping information may include a subblock length and data bytes n to n+M1+M* when the color mapping type is matrix conversion. Data byte n of the color mapping information may include M1 which is the number of rows and M2 which is the number of columns. In addition, data bytes n+1 may include information about a first coefficient included in the matrix, data byte n+2 may include information about a second coefficient, and data byte n+M1*M2 may include information about an (M1*M2)-th coefficient.

FIG. 4 illustrates InfoFrame including dynamic range information and color gamut information according to another embodiment of the present invention. The HDR/WCG video InfoFrame has been defined and detailed information included therein has been described in the above embodiment. In the present embodiment, AVI InfoFrame (version 3) predefined in CEA 861 is extended to deliver information related to dynamic range mapping and color mapping. Alternatively, AVI InfoFrame (version 4) of a new version may be defined to deliver information related to dynamic range mapping and color mapping. As shown, AVI InfoFrame may include InfoFrame type code information that may have a value of 0x02 which indicates AVI InfoFrame. In addition, AVI InfoFrame may include InfoFrame version number information which indicates that AVI InfoFrame has been extended when set to 3 and indicates that AVI InfoFrame is newly defined when set to 4, as described above. Further, AVI InfoFrame may include InfoFrame length information, data bytes 1 to 18 and N1 to N4 data bytes. Data bytes 1 to 13 may include information on predefined AVI InfoFrame. Data bytes 14 to 18 and N1 to N4 data bytes may represent extended AVI InfoFrame and include dynamic range information and color gamut information. Data byte 14 may include a frame grouping type and data byte 15 may include Update From Previous Frame Info, Cancel Previous Info, Reuse Current Frame Info, and End of Additional HDR Video information. Data byte 16 may include Current Video Info Present and Target Info Present. Data byte 17 may include dynamic ranging mapping type information and color mapping type information. Data byte 18 may include color precision, color space type and constant luminance. N1 data bytes may include current video information if Current Video Info Present is set to 1 and N2 data bytes may include target video information if Target Info Present is set to 1. In addition, N3 data bytes may include dynamic range mapping information and N4 data bytes may include color mapping information. Detailed description of the information is identical to definition in the above-described HDR/WCT video InfoFrame and thus is omitted. According to the above-described embodiments of the present invention, predefined AVI InfoFrame may be extended or AVI InfoFrame may be newly defined to deliver dynamic range information and color gamut information together to a sink device.

Next, a method of delivering display related information from a sink device to a source device will be described. In the present invention, the sink device processes HDR/WCG video on the basis of information delivered from the source device and then displays the processed HDR/WCG video. In this case, a new tag code may be defined in the extended display identification data (EDID) or a predefined part may be extended to signal display related information. Alternatively, display related information may be signaled by newly defining the same in display ID or by using a predefined display parameters data block, a display device data block, a vendor-specific data block, a product identification data block and the like.

Additional signaling information which indicates that AVI InfoFrame has been extended may be included in the previous AVI InfoFrame as necessary. This signaling information may be defined in dynamic range and mastering InfoFrame. In this case, a method for indicating whether AVI InfoFrame has been extended may be included in order to secure compatibility with previous specifications.

FIG. 5 illustrates a method of delivering display related information using the EDID. This method is an embodiment with respect to a case in which a data block is newly defined in the EDID and may be equally applied to other cases. In this case, post-processing related information, that is, information about whether processing with respect to dynamic range mapping and color mapping is possible may be delivered.

The first byte of the EDID may include a tag code and information indicating the length of the following data block in bytes. The second byte of the EDID may include an extended tag code which may have a value of 0x07 reserved for video related blocks. In this case, the extended tag code can indicate that the corresponding data block is an HDR/WCG video information data block. The third byte may include a color space and the fourth byte may include constant luminance. In addition, the fifth byte may include current video info request information and target video info request information. The sixth byte may include dynamic range mapping information and the seventh byte may include color mapping information.

The extended tag code may define the HDR/WCG video information data block using a reserved extension tag code value. In the present embodiment, 0x07 among reserved tag codes can be used.

The color space (CS) may represent a color space which can be used in the sink device during dynamic range mapping and color mapping. For example, the CS can indicate RGB, XYZ, ACES and L*a*b* can be used when set to 1 for each bit. In addition, the CS may include and deliver meaning corresponding to color precision of InfoFrame. That is, 10-bit RGB and 12-bit RGB may be represented by allocating different bits thereto. Alternatively, an additional signal may be defined.

The constant luminance indicates whether the sink device can process constant luminance and non-constant luminance during dynamic range mapping and color mapping. The constant luminance indicates that the sink device can process constant luminance and non-constant luminance during dynamic range mapping and color mapping when set to 1.

The current video info request information/target video info request information (Cinfo/Tinfo) are bits which request information about current video info/target video info. Cinfo/Tinfo indicate a request for current video info/target video info from the source device.

Dynamic range mapping (DRM) and color mapping (CM) represent dynamic range mapping/color mapping methods executable in the sink device. The source device can optionally transmit information which can be processed in the sink device on the basis of the corresponding information delivered from the sink device.

In another embodiment, when display related information is defined through the predefined dynamic range and mastering data block, extension may be signaled in consideration of backward compatibility. Further, a content color encoding volume supported in the sink device may be additionally represented.

FIG. 6 illustrates a method of delivering display related information using display ID according to another embodiment of the present invention. This corresponds to a method of adding information to the display parameters data block of DisplayID. The display parameters data block is a part which defines parameters of a display device or a sink device. The display parameters data block includes information such as a horizontal image size, a vertical image size, a horizontal pixel count, a vertical pixel count, feature support flags, gamma used in a transfer function, a display aspect ratio and a pixel bit depth. The aforementioned dynamic range mapping and color mapping related information may be delivered along with the display parameters data block to the source device.

In the figure, the display parameters data block may be extended to offsets N to N+4 and may further include a color space, constant luminance, dynamic range mapping information and color mapping information in the extended part. Examples of detailed information included in the information have been described above and thus description thereof is omitted.

FIG. 7 illustrates a method of delivering display related information using display ID according to another embodiment of the present invention. This corresponds to a method of adding information to the display device data block of DisplayID. The display device data block is a part which defines panel characteristics of a display device. The display device data block may include information about a display device type, a display device operating mode, a device native pixel format, a display aspect ratio, a bit depth and response speed. In the present embodiment, the information included in the display device data block and the above-described dynamic range mapping and color mapping related information may be delivered to a source device. In the figure, the display device data block may be extended to offsets N to N+4 and may further include a color space, constant luminance, dynamic range mapping information and color mapping information in the extended part. Examples of detailed information included in the information have been described above and thus description thereof is omitted.

Similarly, dynamic range mapping and color mapping related information may be delivered to the source device using a vendor-specific data block of DisplayID. The vendor-specific data block may be used when information which is not defined in the current data block needs to be transmitted. Previous data blocks do not have a part which defines a dynamic range of a display panel, and thus the above-described dynamic range mapping and color mapping related information may be delivered using the vendor-specific data block.

Figure 8:
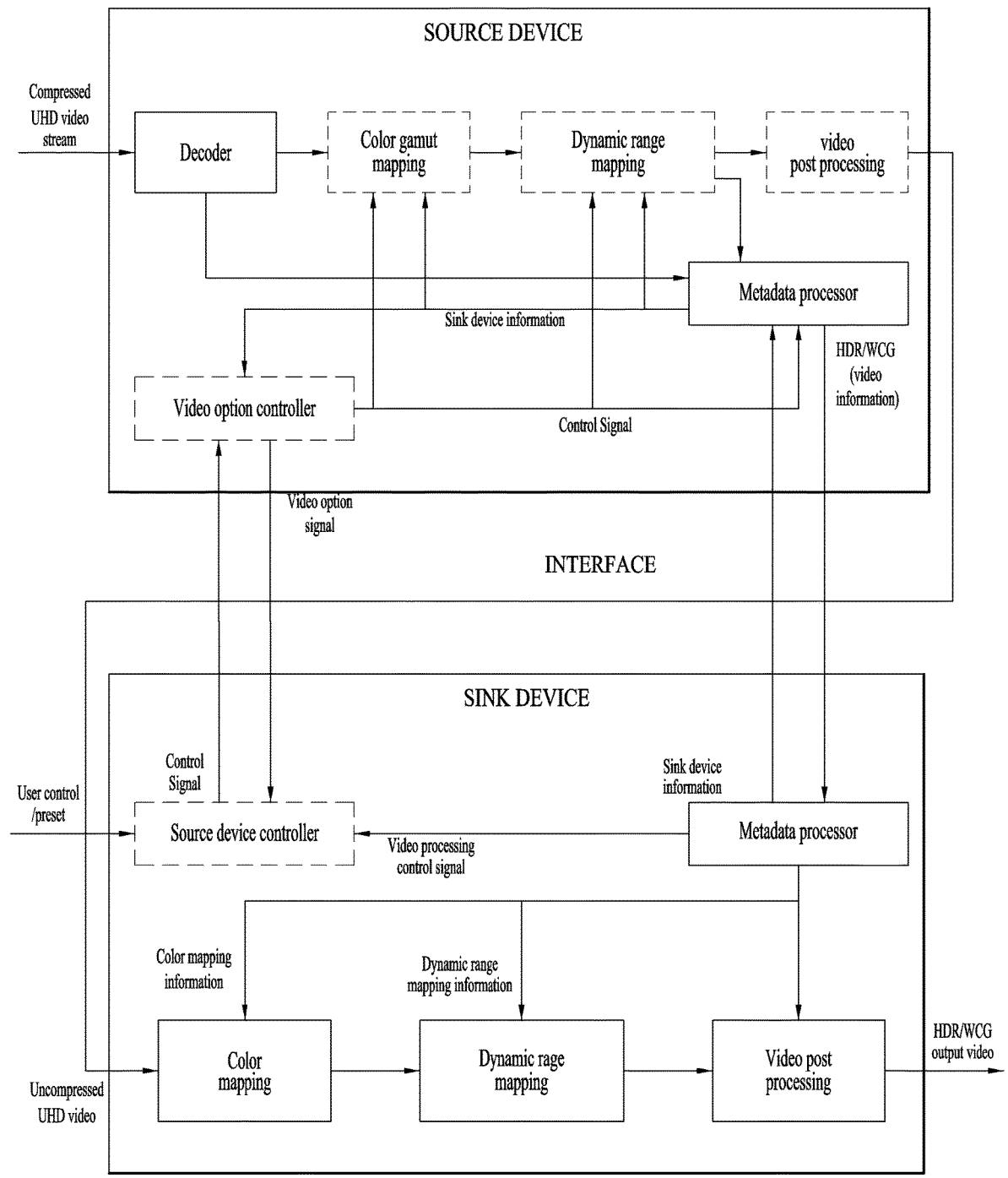
FIG. 8 illustrates operations of a source device and a sink device for adaptive video processing according to an embodiment of the present invention.

FIG. 8 illustrates operations of a source device and a sink device for adaptive video processing according to an embodiment of the present invention. The source device may include a decoder for decoding a compressed video stream, a color gamut mapper for performing color gamut mapping, a dynamic range mapper for performing dynamic range mapping, a video processor for post-processing a video signal included in the video stream, a metadata processor for acquiring and processing metadata, and a transmitter/receiver. The transmitter/receiver may transmit a video signal and transmit/receive metadata. According to an embodiment, the source device may further include a video option controller.

The sink device may include a color mapper for performing color mapping, a dynamic range mapper for performing dynamic range mapping, a video processor for post-processing a video signal, a metadata processor for acquiring and processing metadata and a transmitter/receiver. The transmitter/receiver may receive a decoded compressed video signal and transmit/receive metadata. According to an embodiment, the sink device may further include a source device controller.

In the present invention, operation scenarios may be classified according to sink device capabilities, and each scenario may include 1) information exchange between the source device and the sink device, 2) video processing and 3) display, which correspond to a process through which the source device acquires metadata information of the sink device, video processing based on information about display and video, and a process of outputting delivered video, respectively. In the present embodiment, WCG and HDR are considered and a case in which video processing is performed in the sink device may be considered.

Here, different operations may be performed according to capabilities of the sink device. When the sink device cannot process video information (i.e., in the case of a legacy device), the source device may secure content suitable for a legacy display device or generate a video format adapted to the legacy display device through video processing. Conversely, when the sink device has sufficient capabilities to output images with enhanced video quality without processing information of content, images can be presented without additional processing according to determination of the source device or the sink device. In the following, a case in which the source device and the sink device can process video/display information is assumed.

In the first step, the sink device may deliver display metadata to the source device using the transmitter. Here, information about EOTF defined in color primary information in the EDID (based on CEA 861-F) and HDR static metadata data block based on CEA 861.3, a supportable static metadata type, desired content max luminance, desired content max frame average luminance and desired content min luminance may be delivered, and this information may be processed in the metadata process of the source device. This information may be stored in the source device (e.g., the metadata processor) after being delivered to the source device during source-sink handshaking, and then continuously referred to. Alternatively, the sink device may be requested to deliver this information as necessary.

In addition, video processing related information (dynamic range mapping type, color mapping type, color space type, constant luminance, etc.) defined in the present invention and supported by the sink device may be delivered to the source device. This information may be delivered during the aforementioned handshaking process or when the corresponding function is needed.

Furthermore, a control signal with respect to the source device may be delivered. In this case, the source device controller included in the sink device may determine a display processing range on the basis of information about types of video processing which can be performed by the source device and deliver the control signal according to the determined result. Alternatively, a control signal for a module set by default may be delivered without information about the sink device. The present invention is described on the basis of a method of delivering a default value for a source device control signal or delivering no default value in the initial stage.

The aforementioned handshaking process is an operation performed when the source device and the sink device are connected, and when different pieces of content such as broadcast and streaming are continuously reproduced in a state in which the source device and the sink device are connected, signal exchange between the devices may be required at a content change time or a specific scene change time.

In the second step, the source device may deliver HDR/WCG video information to the sink device using the transmitter. The source device may decode a compressed HDR/WCG stream (UHD video stream) and then acquire information about video. The metadata processor included in the source device acquires the information about video on the basis of metadata (e.g., a WCG SEI message, an HDR SEI message or the like) delivered along with the video. The information may include not only a color gamut, a dynamic range and an electro-optical transfer function but also static metadata such as display color primary, white point, display max/min luminance, max content luminance and max frame-average luminance. In addition, dynamic range mapping and color mapping related information may be included. The aforementioned information may be delivered through VUI and SEI messages, and specifically, through a method defined in SEI messages defined in HEVC standards, such as a mastering_display_colour_volume SEI message, a knee_function_info SEI message and a color_remapping_info SEI message.

When HDR/WCG video processing is performed in the source device, the aforementioned information is processed in the source device using the video processor. However, when the sink device performs HDR/WCG video processing, the metadata processor of the source device needs to send the aforementioned information delivered through a video stream to the sink device in an appropriate format. Here, the metadata processor may deliver the aforementioned information using the transmitter. For example, processing in a more suitable device can be determined through information exchange through the video option controller. Here, information which can be processed in the sink device may be selectively sent on the basis of display metadata information about the sink device, which is delivered in the aforementioned first step. If information is limited, the information may be set to be delivered all the time. If it is determined that information is not processed as in a legacy display, the information may not be sent. When it is determined that the sink device can process information, it is possible to deliver color gamut information through the aforementioned AVI InfoFrame and to deliver the EOTF, static metadata type, and dynamic range related information (color primary, white point and max/min luminance) and content information (max content light level and max frame-average light level) of a mastering display through dynamic range and mastering InfoFrame. In addition, it is possible to deliver the aforementioned detailed dynamic range mapping and color mapping related information (current video information, target information, dynamic range mapping information, color mapping information, color space information and constant luminance information) through the method proposed by the present invention. Information delivered through other InfoFrame may be defined and delivered together with the aforementioned information through the proposed method as necessary.

Information delivery from the source device to the sink device may depend on frame grouping type, and information may be delivered with transmission frequency adapted to characteristics thereof, for example, in units of frame or scene.

In the third step, dynamic range mapping and color mapping may be performed. The sink device may perform dynamic range mapping and color mapping using the dynamic range mapper and the color mapper on the basis of video processing information received from the source device. Here, the sink device may determine whether mapping signaled through current video information and target information delivered from the source device needs to be used and apply mapping. A separate module for mapping may be configured or mapping may be performed using a module related to dynamic range mapping/color mapping, which is configured in the sink device.

In the fourth step, the sink device may display final UHD video. Here, while the sink device can present the video processed through the source device, the sink device may determine whether the video has been processed to be adapted to the display through the metadata processor and generate a control signal through the source device controller. That is, when the video has not been suitably processed, the sink device may determine a part having a problem during video processing of the source device and deactivate the part through the control signal. Further, the sink device may process video data using the video processor (video post-processor) as necessary.

Alternatively, a desired function may be turned on/off at the request of a user. To this end, the sink device may provide video processing options which can be processed or is being processed in the source device and a menu/user interface (UI) for controlling the same to the user. In addition, when there is a function of adjusting luminance and color of the display, information of the metadata processor of the sink device may be analyzed and then the display is controlled through a display panel controller to provide a presentation environment (presentation luminance) suitable for content.

Although the HDR/WCG video information may be delivered by defining new InfoFrame or extending AVI InfoFrame as described above, the HDR/WCG video information may be defined in dynamic range and mastering InfoFrame as the concept of additional information related to HDR/WCG. Here, 1) a new value is allocated to a predefined static_metadata_descriptor ID to define HDR/WCG video information, 2) static_metadata_descriptor may be extended, 3) EMD_ID may be defined and delivered as additional information distinguished from SMD or 4) separate InfoFrame may be defined and then information thereof may be delivered.

FIG. 9 illustrates a method of extending static metadata descriptor ID of video information and delivering the video information to the sink device. As a method of providing additional information related to HDR/WCG video, a static_metadata_descriptor ID (SMD_ID) may be additionally defined. For example, in addition to previous definition of static metadata type 1 when SMD_ID=0, SMD_ID indicates HDR/WCG video information when set to 1.

Here, information indicating a video information application range (e.g., units of frame, scene and content) such as frame grouping type, information for which a unit of transmission from the source device to the sink device needs to be determined, and major information may be defined using reserved bits of the existing dynamic range and mastering InfoFrame. Example of the major information may include color space type, color precision and constant luminance. In other words, information in HDR/WCG video information may be applied to entire content or applied to a scene or a frame in the content depending on frame grouping type. When the HDR/WCG video information is applied to entire content, the video information may be used as static metadata.

As shown, the dynamic range and mastering InfoFrame may include InfoFrame type code that may have a value of 0x07 which indicates dynamic range and mastering InfoFrame. In addition, the dynamic range and mastering InfoFrame may include InfoFrame version number information which may have a value of 0x01. Further, the dynamic range and mastering InfoFrame may include InfoFrame length information, data bytes 1 to 6 and N1 to N4 data bytes. Data bytes 2 to 6 and N1 to N4 data bytes are extensions of static metadata descriptor ID and may include dynamic range information and color gamut information described in the present invention. Data byte 1 may include EOTF. Data byte 2 may include frame grouping type and static_metadata_descriptor ID (SMD_ID). As described above, SMD_ID may have a value of 1, which indicates that a static metadata descriptor is HDR/WCG video information metadata type. Data byte 3 may include Update From Previous Frame info, Cancel Previous info, Reuse Current info and End of HDR/WCG video information. Data byte 4 may include Current Video Info Present and Target Info Present. Data byte 5 may include dynamic range mapping type information and color mapping type information. Data byte 6 may include color precision, color space type and constant luminance. N1 data bytes may include current video information when the aforementioned Current Video Info Present is set to 1 and N2 data bytes may include target video information when the aforementioned Target Info Present is set to 1. In addition, N3 data bytes may include dynamic range mapping information and N4 data bytes may include color mapping information. Detailed description of the information may be identical to the aforementioned definition of the HDR/WCG video information and thus is omitted. According to the embodiment of the present invention, the predefined static metadata descriptor ID of the dynamic range and mastering InfoFrame may be extended to deliver dynamic range information and color gamut information together to the sink device.

FIG. 10 illustrates a method of extending the static metadata descriptor and delivering video information to the sink device according to another embodiment of the present invention. A method of extending the static_metadata_descriptor (SMD) and delivering the HDR/WCG video information may be conceived. For example, when SMD_ID=0, the HDR/WCG video information defined in the present invention is delivered after display_primary, white_point, min/max luminance, MaxCLL and MaxFALL defined in data bytes 3 to 26 of SMD. This method may be used not only to define the HDR/WCG video information but also to extend predefined SMD_ID. Here, a new version number (e.g., 0x02) may be assigned, and when backward compatibility is considered, the following method provided by the present invention may be used.

As shown, dynamic range and mastering InfoFrame may include InfoFrame type code that may have a value of 0x07 which indicates dynamic range and mastering InfoFrame. In addition, the dynamic range and mastering InfoFrame may include InfoFrame version number information which may have a value of 0x01. Further, the dynamic range and mastering InfoFrame may include InfoFrame length information, data bytes 1 to n+5 and N1 to N4 data bytes. Data bytes n+1 to n+5 and N1 to N4 data bytes are extensions of static metadata descriptor and may include dynamic range information and color gamut information described in the present invention. Data byte 1 may include an SMD extension flag and EOTF. Data byte 2 may include the length of SMD extension or the length of SMD and SDM ID. In addition, data bytes 3 to n may include information included in the static metadata descriptor (SMD). SMD extension information may be included in data byte n+1 and following data bytes. Data byte n+1 may include frame grouping type. Data byte n+2 may include Update From Previous Frame info, Cancel Previous info, Reuse Current info and End of HDR/WCG video information. Data byte n+3 may include Current Video Info Present and Target Info Present. Data byte n+4 may include dynamic range mapping type information and color mapping type information. Data byte n+5 may include color precision, color space type and constant luminance. N1 data bytes may include current video information when the aforementioned Current Video Info Present is set to 1 and N2 data bytes may include target video information when the aforementioned Target Info Present is set to 1. In addition, N3 data bytes may include dynamic range mapping information and N4 data bytes may include color mapping information.

The SMD_extension_flag may be used to indicate that the predefined static metadata descriptor has been extended.

The length of SMD extension or the length of SMD indicates the length of the descriptor and may be used to distinguish the extended descriptor from the previous descriptor. An example of representing the length of the extended descriptor is described in the present invention. In this case, information on the length of following HDR metadata InfoFrame may be used to indicate the length of previous SMD. For example, when SMD_extension_flag is 1, the total length of the descriptor corresponds to the sum of the length of following HDR Metadata InfoFrame and the length of SMD extension. When the length of following HDR Metadata InfoFrame indicates the total length of the descriptor, the length of the previous descriptor may be indicated using the length of SMD instead of the length of SMD extension.

According to an embodiment, a method of comparing the length of following HDR metadata InfoFrame with the length of SMD extension and indicating additional extension when the lengths are different from each other without using the SMD_extension_flag may be used.

In the above embodiment, information indicating an information application range (e.g., units of frame, scene and content) such as frame grouping type, information for which a unit of transmission from the source device to the sink device needs to be determined, and major information may also be defined using reserved bits of the existing dynamic range and mastering InfoFrame. Here, information defined in SMD extension may be information applied to entire content or applied to a scene/frame depending on frame grouping type.

Detailed description of other pieces of information may be identical to the aforementioned definition of the HDR/WCG video information and thus is omitted. According to the embodiment of the present invention, the predefined static metadata descriptor of the dynamic range and mastering InfoFrame may be extended to deliver dynamic range information and color gamut information together to the sink device.

Figure 11:
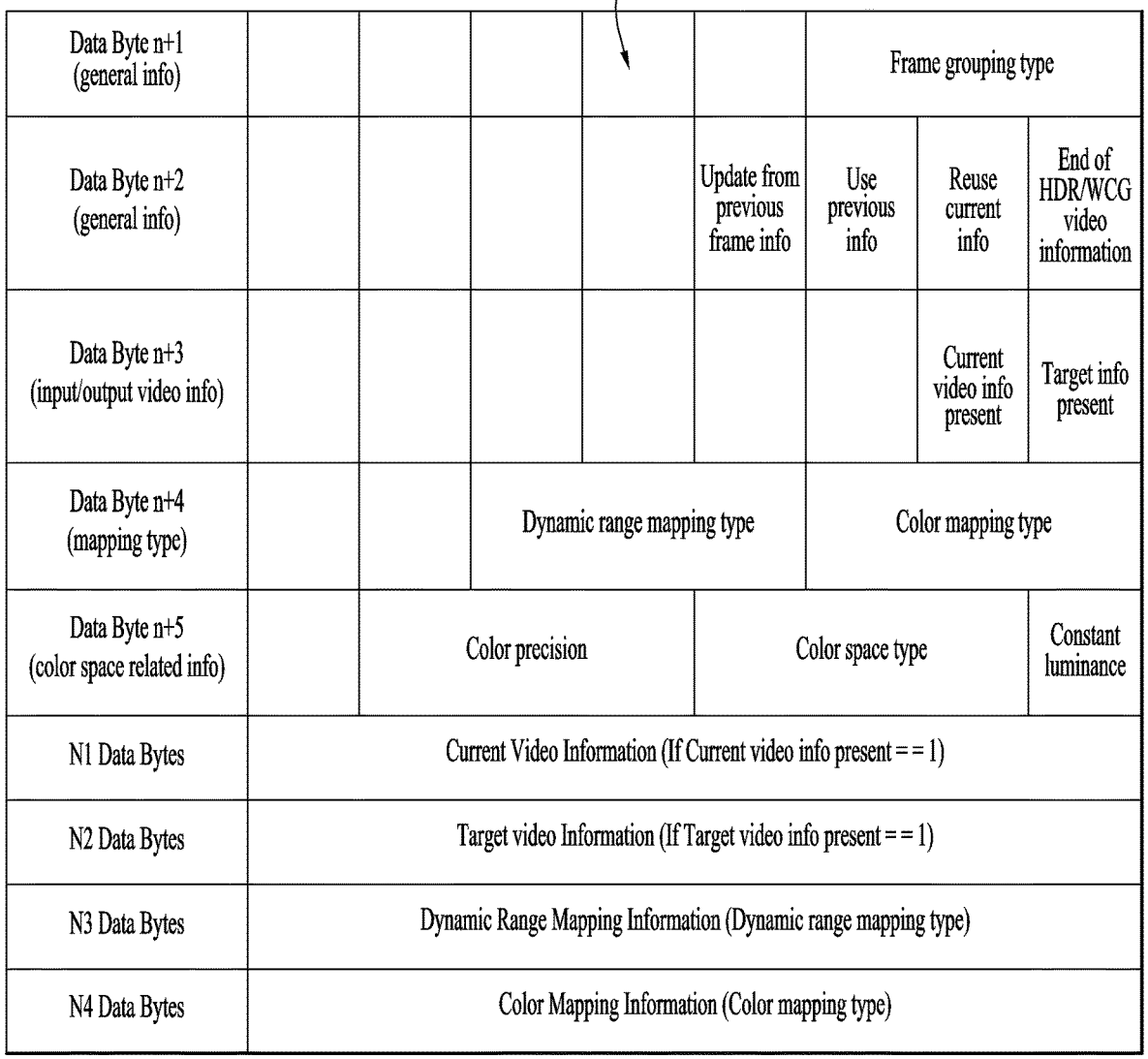
FIG. 11 illustrates a method of separately defining a dynamic metadata descriptor ID and delivering video information to a sink device according to another embodiment of the present invention.

FIG. 11 illustrates a method of separately defining a dynamic metadata descriptor ID and delivering video information to the sink device according to another embodiment of the present invention. In another embodiment, a case in which information independent of static metadata is delivered in dynamic range and mastering InfoFrame (InfoFrame type=0x07) simultaneously with the static metadata may be conceived. Although only the descriptor is extended in the above-described embodiment, metadata properties are clearly classified and an ID is assigned to extended metadata to simultaneously deliver various types of metadata in the present embodiment.

As shown, dynamic range and mastering InfoFrame may include InfoFrame type code that may have a value of 0x07 which indicates dynamic range and mastering InfoFrame. In addition, the dynamic range and mastering InfoFrame may include InfoFrame version number information which may have a value of 0x01. Further, the dynamic range and mastering InfoFrame may include InfoFrame length information, data bytes 1 to n+5 and N1 to N4 data bytes. Data bytes n+1 to n+5 and N1 to N4 data bytes include information of an extended metadata descriptor and may include dynamic range information and color gamut information described in the present invention. Data byte 1 may include an Extended_Metadata_Descriptor_ID and EOTF. Data byte 2 may include the length of extended metadata descriptor ID and SDM ID. In addition, data bytes 3 to n may include information of a static metadata descriptor (SMD). The information of the extended metadata descriptor may be included in data byte n+1 and following data bytes. Data byte n+1 may include frame grouping type. Data byte n+2 may include Update From Previous Frame info, Cancel Previous info, Reuse Current info and End of HDR/WCG video information. Data byte n+3 may include Current Video Info Present and Target Info Present. Data byte n+4 may include dynamic range mapping type information and color mapping type information. Data byte n+5 may include color precision, color space type and constant luminance. N1 data bytes may include current video information when the aforementioned Current Video Info Present is set to 1 and N2 data bytes may include target video information when the aforementioned Target Info Present is set to 1. In addition, N3 data bytes may include dynamic range mapping information and N4 data bytes may include color mapping information.

The Extended_Metadata_descriptor_ID (EMD ID) identifies additional information. Here, the EMD ID may serve as an identifier for indicating metadata having a characteristic/type different from the SMD ID and identify the type of the HDR/WCG video information proposed by the present invention. The EMD ID may indicate that there is no extended metadata when set to 0, indicate HDR/WCG video information metadata type 1 when set to 1 and indicate HDR/WCG video information metadata type 2 when set to 2. EMD IDs may be divided according to descriptor types. For example, EMD IDs may be divided in a case in which different dynamic range mapping and color mapping methods are used, in the case of different application units (scene and frame), in the case of different types of target information, that is, in a case in which parts of target information are different, etc.

In the present embodiment, it is assumed that the Extended_Metadata_Descriptor ID includes the role of the SMD_extension_flag defined in the aforementioned embodiment. That is, EMD_ID may indicate presence of only SMD when set to 0 and indicate presence of a different type of metadata following the static_metadata_descriptor when set to a value greater than 0. Conversely, a case in which SMD is not present and only EMD is present may be conceived. For example, when SMD_ID may indicate no static metadata descriptor when SMD_ID==7.

The length of extended metadata descriptor may be used to indicate the length of the EMD. The length of extended metadata descriptor may signal no EMD when set to 0. The length of SMD may be additionally designated as necessary. Detailed description of other pieces of information may be identical to the aforementioned definition of the HDR/WCG video information and thus is omitted. According to the embodiment of the present invention, the predefined static metadata descriptor of the dynamic range and mastering InfoFrame may be extended to deliver dynamic range information and color gamut information together to the sink device.

FIG. 12 illustrates a method of defining a separate InfoFrame for video information according to an embodiment of the present invention. Distinguished from the method of extending the dynamic range and mastering InfoFrame, a method of defining a separate InfoFrame may be conceived. Here, information included in the dynamic range and mastering InfoFrame is correlated with information included in the HDR/WCG video InfoFrame in that they have information for HDR/WCG content, production environment and display, and signaling considering the correlation is required.

To this end, data byte 1 of the dynamic range and mastering InfoFrame may include extended metadata descriptor ID and data byte 2 thereof may include a frame grouping type and an HDR/WCG video info present flag. The HDR/WCG video info present flag is defined in the dynamic range and mastering InfoFrame and may indicate presence or absence of HDR/WCG video InfoFrame. That is, the HDR/WCG video info present flag signals presence of detailed information related to HDR/WCG video, that is, information related to tone mapping and color mapping in units of content/scene/frame as in the present embodiment such that a receiver can use only information in the SMD and refer to enhanced information.

Detailed information about the HDR/WCG video InfoFrame, such as EMD_ID, frame grouping type and color space type, may be signaled using reserved bits in the dynamic range and mastering InfoFrame as necessary. Alternatively, target information and current video information may be signaled in the SMD as necessary.

As described above, the dynamic range and mastering InfoFrame can signal presence or absence of the HDR/WCG video InfoFrame. As shown, the HDR/WCG video InfoFrame may include InfoFrame type code that may have a value of 0x08 which indicates the HDR/WCG video InfoFrame. In addition, the HDR/WCG video InfoFrame may include InfoFrame version number information which may have a value of 0x01. Further, the HDR/WCG video InfoFrame may include InfoFrame length information, data bytes 1 to 5 and N1 to N4 data bytes. Data byte 1 may include Extended_Metadata_Descriptor_ID and frame grouping type. Data byte 2 may include Update on Dynamic Range and Mastering InfoFrame flag, Update From Previous Frame info, Cancel Previous info, Reuse Current info and End of HDR/WCG video information. Data byte 3 may include Current Video Info Present and Target Info Present. Data byte 4 may include dynamic range mapping type information and color mapping type information. Data byte 5 may include color precision, color space type and constant luminance. N1 data bytes may include current video information when the aforementioned Current Video Info Present is set to 1 and N2 data bytes may include target video information when the aforementioned Target Info Present is set to 1. In addition, N3 data bytes may include dynamic range mapping information and N4 data bytes may include color mapping information.

The Extended_Metadata_descriptor_ID is the same as defined in the previous figure. In the present embodiment, however, separate InfoFrame is defined and thus EMD_ID may be used when descriptors are divided according to types.

The Update on Dynamic Range and Mastering InfoFrame flag is defined in the HDR/WCG video InfoFrame and signals whether information included in the dynamic range and mastering InfoFrame has been changed. For example, when information about entire content is delivered through the dynamic range and mastering InfoFrame, the dynamic range and mastering InfoFrame can be delivered only in environments such as initial part of content, channel change and initial part of GOP, and information update situation thereafter can be monitored through the Update on Dynamic Range and Mastering InfoFrame flag. For stabilized operation, the condition that the flag must be maintained for several seconds before the dynamic range and mastering InfoFrame is changed or for several seconds from a changed frame may be provided as necessary.

Detailed information about other pieces of information may be the same as definition in the HDR/WCG video InfoFrame and thus is omitted.

FIG. 13 illustrates a method of delivering sink device information to a source device according to an embodiment of the present invention. When HDR/WCG video information is delivered in the dynamic range and mastering InfoFrame or HDR/WCG video InfoFrame is separately defined as in the above-described embodiments, the predefined HDR static metadata data block may be extended to deliver HDR/WCG video information from a sink device to a source device as shown in the figure.

The HDR static metadata data block may have extended tag code of 0x06, and first to seventh bytes may include the existing information of the HDR static metadata data block. In addition, eighth to thirteenth bytes may include information extended in association with HDR/WCG video information. The thirteenth byte may include extended metadata (EM) which indicates extended metadata type. That is, the EM indicates whether the sink device can process extended metadata corresponding to EMD_ID defined in the above-described embodiment. The EM indicates that the sink device can process the extended metadata when set to 1 and indicates that the sink device cannot process the extended metadata when set to 0. Here, DRM, CM, CS and CL may be signaled by being included in the EM. In this case, DRM, CM, CS and CL may not be separately signaled. In addition, DRM and CM may be used as parameters in the EM. That is, the parameters may be used when EM type changes according to DRM and CM. Information such as DRM, CM, CS, CL, Cinfo and Tinfo conform to the definition in the above-described embodiments.

FIG. 14 illustrates a method of delivering sink device information to a source device according to an embodiment of the present invention. When HDR/WCG video information is delivered in the dynamic range and mastering InfoFrame or HDR/WCG video InfoFrame is separately defined as in the above-described embodiments, a separate HDR/WCG video information data block may be allocated to deliver HDR/WCG video information from a sink device to a source device as shown in the figure. The separate HDR/WCG video information data block may be defined in the EDID and DisplayID as in the aforementioned embodiments. The HDR/WCG video information data block may have extended tag code of 0x07 and may include first to eighth bytes. The first byte may include tag code (0x07) and data block length information. The second byte may include extended tag code (0x07) and may indicate the HDR/WCG video information data block. The third to seventh bytes may include CS, CL, Cinfo, Tinfo, DRM, CM and EM which have been described in the aforementioned embodiments. The fourth byte may include a dynamic range metadata information request (DRMI_req) in addition to CL information. The DRMI_req is a flag which requests dynamic range metadata information and corresponds to the Update on Dynamic Range and Mastering InfoFrame flag in the InfoFrame. For example, when the Update on Dynamic Range and Mastering InfoFrame flag is 1, the DRMI_req may be set to 1 to request changed dynamic range metadata information from the source device. The eighth byte may include extended metadata (EM) which indicates extended metadata type. That is, the EM indicates whether the sink device can process extended metadata corresponding to EMD_ID defined in the above-described embodiment. The EM indicates that the sink device can process the extended metadata when set to 1 and indicates that the sink device cannot process the extended metadata when set to 0.

In the following, an embodiment with respect to a case in which multiple pieces of information are delivered will be described. When multiple pieces of information are delivered, if processing is performed differently according to local features in frames, a method of delivering local feature information and a related processing method (dynamic range mapping information and color mapping information) may be considered. Alternatively, the method may be considered when various targets are set, various processing methods are provided, different processing methods are provided for a multiview image according to views, and the like. Here, various types of information may be delivered in one InfoFrame, and each type of information is delivered through information type and information necessary for each type of information is delivered. Although current video information, target information, DRM information and CM information are delivered for each type of information in the following embodiment, the information may be selectively sent or may be sent in higher category when applied to all types of information.

In the following case, a separate InfoFrame is defined. As necessary, the separate InfoFrame may be defined in the existing InfoFrame as in the previous invention.

FIG. 15 illustrates a method of defining a separate InfoFrame for video information according to an embodiment of the present invention. HDR/WCG video InfoFrame may include InfoFrame type code having a value of 0x08 which indicates the HDR/WCG video InfoFrame, as shown in the figure. In addition, the HDR/WCG video InfoFrame may include InfoFrame version number which may have a value of 0x01. Further, the HDR/WCG video InfoFrame may include InfoFrame length information, data bytes 1 to 8 and N0 to N5 data bytes per information set. Data byte 1 may include Extended_Metadata_Descriptor ID and frame grouping type. Data byte 2 may include a multiple info flag, Update on Dynamic Range and Mastering InfoFrame flag, Update from Previous Frame Info, Cancel Previous Info, Reuse Current Info and End of HDR/WCG Video information. Data byte 3 may include Local Feature Info Present, Current Video Info Present and Target Info Present information. Data byte 4 may include dynamic ranging mapping type information and color mapping type information. Data byte 5 may include color precision, color space type and constant luminance. Data bytes 6 and 7 may include a multiple target flag, multiple method flag, multiple local feature flag and multiple view flag, and the number of information sets. In addition, each information set may be composed of a data byte including the information on the length of the corresponding information set, and N0 to N5 data bytes. N0 data bytes may include an exclusive info flag, subset existence flag, a total number of subsets, subset number and information type. N1 data bytes may include current video information when the aforementioned Current Video Info Present information is set to 1 and N2 data bytes may include target video information when the aforementioned Target Info Present information is set to 1. In addition, N3 data bytes may include dynamic range mapping information and N4 data bytes may include color mapping information. N5 data bytes may include local feature information. N0 to N5 data bytes may be defined per information set.

The multiple info flag is information which signals whether multiple pieces of information are provided. The multiple info flag may signal provision of multiple pieces of information in advance when set to 1. The local feature info present information signals whether a local feature in a frame is provided. When this information is set to 1, a local feature is provided in addition to entire features. The following information is flags for signaling delivery of multiple pieces of information to a sink device. The multiple target flag indicates a case in which various targets are set when multiple pieces of information are delivered. This information indicates delivery of multiple processing methods for various targets when set to 1. The multiple method flag indicates a case in which various processing methods are delivered during delivery of multiple pieces of information. This information indicates delivery of various processing methods when set to 1. The multiple local feature flag indicates a case in which processing depends on features in a frame during delivery of multiple pieces of information. This information indicates delivery of local feature information and/or a processing method (dynamic range mapping information and color mapping information) for processing depending on features when set to 1. The multiple view flag indicates a case in which different processing methods are provided for a multiview image according to views when multiple pieces of information are delivered. The number of information sets indicates the number of processing methods/features. Length of information set A indicates the length of information A among multiple pieces of delivered information. The following information corresponds to each option with respect to multiple pieces of delivered information. The following information may be defined for each type of information.

The exclusive info flag indicates whether corresponding information is used selectively or overall. For example, when information according to local features is delivered, local features constitute a frame and thus all information included in the local features needs to be used. In this case, the exclusive info flag is set to 0. Conversely, when one of various types of information is selected and used, such as a case in which different processing methods are delivered according to targets, the exclusive info flag is set to 1. Meanwhile, when multiple pieces of information are delivered, multiple pieces of other information may be delivered in the information according to the concept of subset. For example, both a case in which a single processing method is applied to a whole image and a case in which different processing methods are applied according to local features may be supported when information is delivered according to multiple methods. Here, different processing methods according to local features correspond to the concept of subset. In this case, the subset existence flag is set to 1 to additionally signal definition of multiple pieces of information in specific information. The total number of subsets indicates the number of subsets when the subset existence flat is set to 1. The subset number is numbering for identifying subsets when multiple subsets are defined. In the present embodiment, the subset number may have a value in the range of 0 to 7. The information type signals corresponding information among multiple pieces of defined information. Multiple targets, multiple methods, multiple local features and multiple views may be defined as follows and signaled in the present embodiment. That is, the information type can indicate multiple-target information as category 1 when set to 0000. The information type can indicate multiple-local feature information as category 2 when set to 0001. The information type can indicate multiple-method information as category 3 when set to 0010. The information type can indicate multiple-view information as category 4 when set to 0011.

The local feature information signals a method for identifying a local feature when the local feature info present or multiple local feature flag is 1.

Detailed description of other pieces of information may be the same as definition in the aforementioned DNR/WCG video InfoFrame and thus is omitted.

FIG. 16 illustrates a method of delivering multiple pieces of information of a sink device to a source device according to an embodiment of the present invention. As shown, a separate HDR/WCG video information data block may be allocated to deliver HDR/WCG video information from the sink device to the source device. The HDR/WCG video information data block may be defined in the EDID and DisplayID. The HDR/WCG video information data block may have a value of 0x07 and may include first to ninth bytes. The first byte may include tag code (0x07) and data block length information. The second byte may include extended tag code (0x07) and may indicate the HDR/WCG video information data block. The third to seventh bytes may include CS, CL, Cinfo, Tinfo, DRM, CM and EM which have been described in the aforementioned embodiments. The fourth byte may include a dynamic range metadata information request (DRMI_req) in addition to CL information. DRMI_req is a flag which requests dynamic range metadata information and corresponds to the update on dynamic range and mastering InfoFrame flag. For example, when the update on dynamic range and mastering InfoFrame flag is 1, the DRMI_req may be set to 1 to request changed dynamic range metadata information from the source device. The eighth byte may include extended metadata (EM) which indicates extended metadata type. That is, the EM indicates whether the sink device can process extended metadata corresponding to the EMD_ID defined in the above-described embodiment. The EM indicates that the sink device can process the extended metadata when set to 1 and indicates that the sink device cannot process the extended metadata when set to 0. The ninth byte may include multiple extended metadata (Multi_EM). When multiple metadata cannot be processed, Multi_EM is set to 1 to notify the source device that multiple metadata cannot be processed. Here, it is possible to simply signal that multiple metadata can be processed using Multi_EM or to impart a meaning to each bit of Multi_EM to signal subdivided information. For example, it is possible to divide cases in which the sink device can process metadata into a case in which different pieces of metadata according to multiple targets can be processed (e.g., Multi_EM_3==1: multiple target), a case in which different pieces of metadata according to multiple processing methods can be processed (e.g., Multi_EM_2==1: multiple method), a case in which multiple pieces of metadata for applying different methods depending on local features of video can be processed (e.g., Multi_EM_1==1: multiple local feature), and a case in which different pieces of metadata according to multiple views can be processed (e.g., Multi_EM_0==1: multiple view).

When the aforementioned information is used, the source device may sort metadata and selectively deliver appropriate information to the sink device. Alternatively, if the sink device has better processing capabilities, when information which can be processed in the sink device is delivered through Multi_EM, the source device may transmit the corresponding information such that the sink device processes the information.

Figure 17:
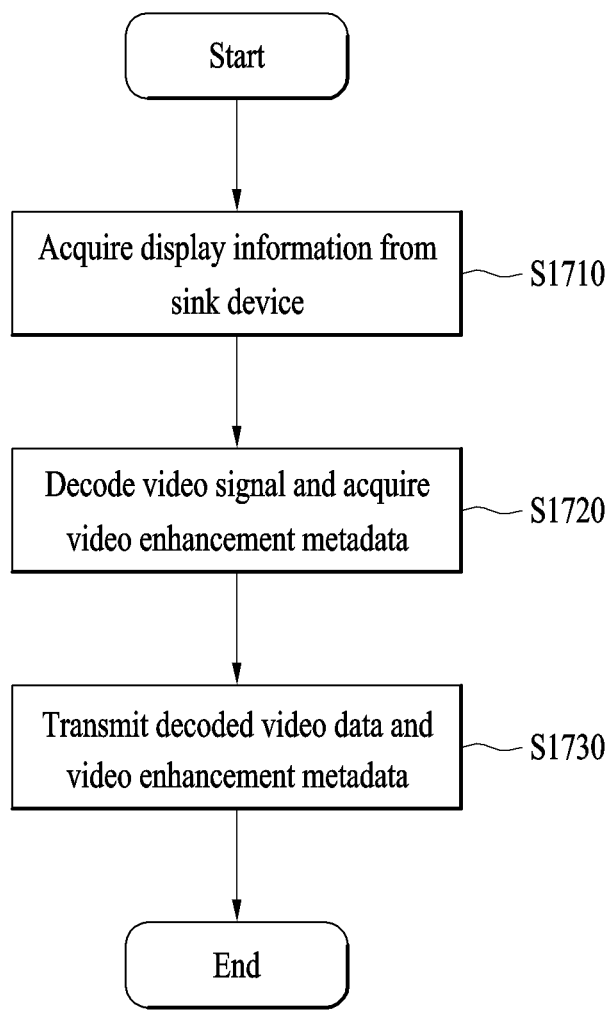
FIG. 17 illustrates a method through which a source device delivers video enhancement metadata to a sink device according to an embodiment of the present invention.

FIG. 17 illustrates a method through which a source device delivers video enhancement metadata to a sink device according to an embodiment of the present invention. The source device may acquire display related information of the sink device from the sink device (S1710). The display related information may be included in a data block defined in the aforementioned EDID or extended EDID and delivered and may include video enhancement metadata processing capability information about the sink device. The source device may selectively deliver video enhancement metadata to the sink device on the basis of the display related information.

The source device may decode a video signal to acquire decoded video data and video enhancement metadata (S1720). Here, the video enhancement metadata may include the aforementioned HDR/WCG video information which can be used for video processing performed by the source device or the sink device.

The source device may deliver the decoded video data and video enhancement metadata to the sink device (S1730). As described above, the video enhancement metadata may be included in an extended InfoFrame or a newly defined InfoFrame and delivered.

Figure 18:
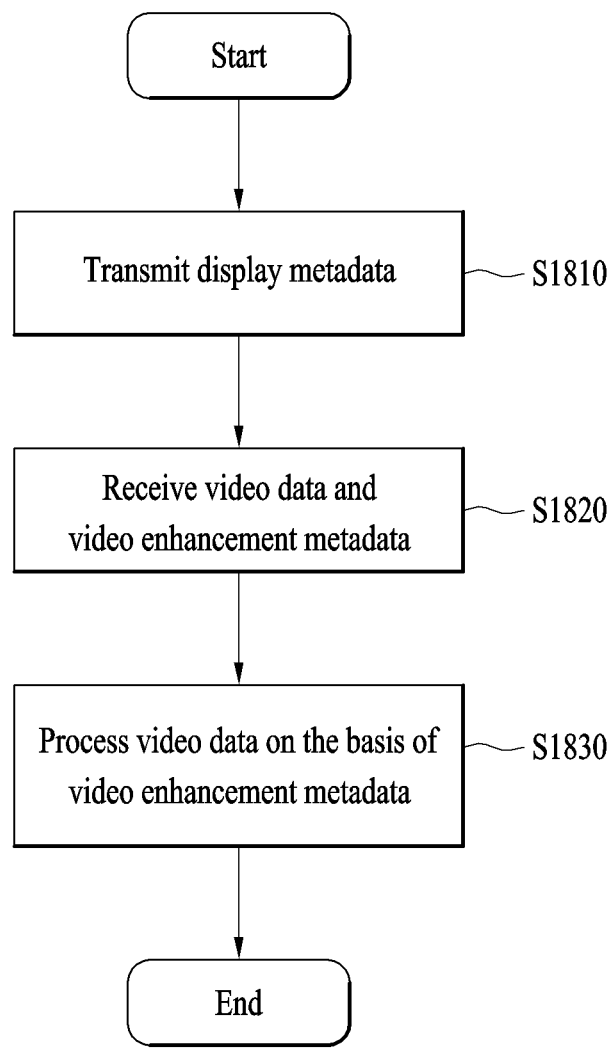
FIG. 18 illustrates a method through which a sink device delivers display metadata to a source device and processes video data according to an embodiment of the present invention.

FIG. 18 illustrates a method through which a sink device delivers display metadata to a source device and processes video data according to an embodiment of the present invention. The sink device may deliver display metadata to the source device (S1810). The display metadata may include video enhancement metadata processing capability information of the sink device. That is, information indicating whether the sink device can process HDR, WCG, extended metadata, color space and constant luminance may be included in the display metadata, as described above. The display metadata may be included in a data block defined in the EDID or extended EDID and delivered.

The sink device may receive video data and video enhancement metadata from the source device (S1820). The video enhancement metadata may include the aforementioned HDR/WCG video information and may be used for post-processing of the received video data. As described above, the video enhancement metadata may be included in the existing InfoFrame or a newly defined InfoFrame and delivered from the source device to the sink device.

The sink device may post-process the video data to reproduce the video data on the basis of the received video enhancement metadata (S1830). Post-processing of the video data may include HDR and WCG related processing, and the sink device can reproduce video data with enhanced video quality.

As described above, the source device and the sink device according to an embodiment of the present invention can exchange display metadata and video enhancement metadata to provide video enhancement effects with respect to video data. The video enhancement metadata can be applied to video data on the basis of synchronization information. Accordingly, video quality enhancement can be applied to all video data or applied per section. A user can be provided with UHD content with enhanced video quality through HDR or WCG information additionally applied to previous UHD content.

FIG. 19 illustrates a structure of a color volume InfoFrame according to one embodiment of the present invention.

According to one embodiment of the present invention, a source device may deliver, to a sink device, information included in information (for example, SEI message of HEVC or AVC streams) delivered together with compressed video (video stream). The information delivered to the sink device may include color volume information.

One embodiment of the present invention describes a method for signaling a color volume, and in this case, the color volume may correspond to any one of a color volume of a content, a color volume of a container transmitting a content, a color volume of a mastering display used when a content is being mastered, and a color volume of a display recommended to display a content.

According to one embodiment of the present invention, the color volume may indicate a solid within a colorimetric space including all colors that can be made by a display. Color volume information indicates information on a color volume, and may include color primaries information, white point information, and/or luminance range information.

According to one embodiment of the present invention, the source device may deliver the color volume information to the sink device through various methods in accordance with update times of the color volume information, an update period of the color volume information, etc. The source device may deliver the color volume by defining a new InfoFrame (color volume InfoFrame), deliver the color volume through a Dynamic Range and Mastering InfoFrame, and deliver the color volume through an Extended InfoFrame.

According to one embodiment of the present invention, InfoFrame indicates a data transmission structure for delivering a variety of information from the source device to the sink device through an interface. Various kinds of InfoFrame may exist in accordance with types of delivered data.

This drawing illustrates a structure of the color volume InfoFrame according to one embodiment of the present invention. The color volume InfoFrame indicates InfoFrame for delivering color volume information from the source device to the sink device.

The color volume InfoFrame according to one embodiment of the present invention may include an InfoFrame Type Code field, an InfoFrame Version Number field, a Length of InfoFrame field, a Data Byte 1 field, a Data Byte 2 field, a Data Byte 3 field and/or a Data Bytes field. According to another embodiment of the present invention, Data Byte including individual fields included in the color volume InfoFrame may be modified. For example, although the information type field is included in the Data Byte 1 field in the embodiment of this drawing, this field may be included in the Data Byte 2 field in another embodiment.

The InfoFrame Type Code field may indicate a type of InfoFrame. The color volume InfoFrame according to one embodiment of the present invention is InfoFrame for delivering color volume information, and may have a value of 0x08.

The InfoFrame Version Number field indicates a version of InfoFrame. The source device may signal whether information included in InfoFrame is modified, through this field.

The Length of InfoFrame field indicates a length of InfoFrame.

The Data Byte 1 field according to one embodiment of the present invention may include an information type field, an Update from previous frame info field, a Cancel previous info field, a Reuse current info field and/or an End of video Information field.

The information type field indicates a range or type indicated by the color volume. For example, this field may indicate whether information on a color volume delivered by InfoFrame according to InfoFrame Type Code is for a content color volume, a mastering display color volume, a target display color volume, or a container color volume. According to one embodiment of the present invention, the content color volume is a color volume of a mastering display and may indicate a solid within a colorimetric space including all colors that can be made by a display used when a content is being mastered. The container color volume is a color volume of a container transmitting a content and may indicate a solid within a colorimetric space including all colors that can express a container. The color volume of the container may mean a color volume of a transmission system transmitting a content. The target display color volume is a color volume of a target display indicating a display recommended to display a content, and may indicate a solid within a colorimetric space including all colors that can be made by a target display. The target display may mean a display targeted to display a content.

The Update from previous frame info field may indicate whether there is an update as compared with previous information when HDR/WCG video InfoFrame is continuously provided. For example, if frame grouping type indicates a scene unit, this field may indicate whether information applied to a current scene has been updated as compared with information applied to a previous scene. If this information is set to 1, it indicates that there is an update within the HDR/WCG video InfoFrame, to allow a user to refer to subsequent information in the HDR/WCG video InfoFrame. Also, this information is set to 0, it indicates that previously provided information may be used as it is. For example, the frame grouping type indicates a scene unit, it may indicate that information applied to the previous scene may be applied to the current scene. Information as to update may be interpreted in association with the frame grouping type information. For example, even if the frame grouping type information indicates a frame type, every frame is not always updated. Accordingly, Update from Previous Frame Info may be subdivided and used.

The Cancel previous info field indicates whether previous information is used. If the corresponding information is set to 1, it may indicate that the previous information is not used. For example, if information as to whether the previous is used is set to 1, it may indicate that information included in HDR/WCG video InfoFrame of a previous frame is not used. That is, the corresponding information may be used to refresh the HDR/WCG video InfoFrame. If the corresponding information is set to 0, it indicates that the previous information can be used. For example, if various types of HDR/WCG video information is given, a case in which the previous information is stored in a specific space and used may be considered. In this case, this information may be used for an operation of removing all of previous information and using only currently provided information. The corresponding field may be interpreted in association with the frame grouping type as mentioned above. For example, when the frame grouping type is a scene type and there is a scene change, this information can be used to indicate the scene change because information discriminated from the previous information needs to be used.

The Reuse current frame info field indicates whether information provided for the current frame can be used even for a neighboring frame or the corresponding information can be used only for the current frame. If information as to whether the current frame is reused has a value set to 1, it may indicate that the information provided for the current frame can be used even for consecutive frames. When a method of providing no additional information for consecutive frames on the basis of Reuse Current Frame Info is used, a data rate may be increased. On the other hand, this information indicates that information provided for the current frame can be used only for the current frame when the Reuse Current Frame Info is set to 0. This field may be interpreted in association with the frame grouping type as mentioned above.

The End of video information field may indicate end of HDR/WCG video information. For example, this information can indicate that corresponding InfoFrame is not used for frames provided later, by using end information when a program using the corresponding InfoFrame ends. In addition, this information may be used to indicate end/transition of a program or end of HDR, or transition to standard dynamic range (SDR) by using the end information.

The Data Byte 2 field according to one embodiment of the present invention may include a color volume type field, a Color space type field and/or a linear representation field.

The color volume type field indicate a method for defining a color volume. According to one embodiment of the present invention, this field may indicate whether a color volume is defined through gamut and luminance range, defined by defining a gamut boundary in accordance with a luminance stage, or defined through a combination of various color spaces.

The Color space type field indicates a type of a main color space in which a color volume is expressed. The color space indicated by this field may include CIE1931, CIELAB, RGB, YCbCr, etc.

The linear representation field indicates whether parameter or information defined in the color volume InfoFrame is defined in a linear domain. A value 1 of this field may indicate that a variety of information defined in the color volume InfoFrame has been defined in the linear domain.

The Data Byte 3 field according to one embodiment of the present invention may include a transfer function type field and/or a recommended inverse transfer function type field.

The transfer function type field indicates a transfer function used when video streams are used by encoding of contents data. According to one embodiment of the present invention, this field may indicate a type of an OETF (optical-electro transfer function) used to indicate a linear value for contents as a non-linear value. That is, this field may identify an OETF function used for video streams. According to one embodiment of the present invention, although an EOTF (electro optical transfer function) indicates an inverse function of the OETF, the EOTF and the OETF may be used commonly. Therefore, this field may identify the EOTF function used for video streams. According to one embodiment of the present invention, if a value of the linear representation field is set to 1, the sink device may linearly indicate a video signal by applying an inverse function of a function indicated by the transfer function type field to the video signal. This field may be used to determine whether the video signal is a signal defined based on relative luminance or a signal defined based on absolute luminance. According to one embodiment of the present invention, this field may indicate OETF of BT.2020, OETF of BT.709, OETF of PQ system of BT.2100, OETF of HLG system of BT.2100, etc.

The recommended inverse transfer function type field indicates a type of a transfer function to be used to transfer a non-linear signal to a linear signal. For example, this field may indicate BT.1886, PQ system of BT.2100, EOTF of PQ system, EOTF of HLG system, inverse of BT.2020, etc.

The Data Bytes field according to one embodiment of the present invention may include fields of Data Bytes 4, 5, 6, etc., and may include a color volume descriptor (information is modified in accordance with a color volume type).

Information of the color volume descriptor may be defined differently in accordance with a value of the color volume type field. If necessary, this descriptor may simultaneously define information of two or more values of the color volume type field. In this case, this descriptor may define information corresponding to each color volume type after defining a number of content color volume type field and defining a color volume type according to the number of color volume type fields. According to another embodiment of the present invention, color volume InfoFrame may include one or more color volume type fields and include a color volume descriptor every color volume type field. A detailed description of the color volume descriptor will be described with reference to the following drawing.

According to one embodiment of the present invention, the InfoFrame Type Code field, the InfoFrame Version Number field, the Lengh of InfoFrame field, the Data Byte 1 field, the Data Byte 2 field and/or the Data Byte 3 field, which are included in the color volume InfoFrame, are information commonly used when indicating a color volume. The sink device may transfer a non-linear signal to a linear signal through an inverse transfer function by using the transfer function type field and/or the color space type field and transfer the existing color space to a color space in which a color volume is expressed, thereby exactly interpreting images. The sink device may perform image processing such as tone mapping and color gamut mapping through the information included in the color volume InfoFrame.

According to one embodiment of the present invention, if the information included in the color volume InfoFrame is used as static information which is not changed for a certain time period, fixed values of update from previous frame info=0, cancel previous info=0, reuse current info=1, and end of video information=0 may be used except that initial information and final information are delivered. According to another embodiment of the present invention, the color volume InfoFrame may separately include a flag or type field indicating whether the information included in InfoFrame is static information or dynamic information which is frequently changed.

FIG. 20 illustrates a configuration of a color volume descriptor according to one embodiment of the present invention.

According to one embodiment of the present invention, a color volume may be configured through a color gamut type, a maximum luminance value and a minimum luminance value. The color volume descriptor according to one embodiment of the present invention may include information required if the color volume is configured as above.

The color volume descriptor according to one embodiment of the present invention may include color gamut type information, minimum luminance value information, maximum luminance value information and/or maximum target luminance value information.

The color gamut type information indicates a color boundary. This information may indicate a color gamut, which is already promised, such as BT.2020, BT.709, and DCI-P3, and may directly indicate respective primaries on a chromaticity plane. For example, this information may signal coordinates x and y of each of red, green and blue colors on a plane CIE1931, and according to another embodiment, this information may signal three or more color coordinates for one color. According to one embodiment, this information may have a size of 1 data bytes.

The minimum luminance value information and the maximum luminance value information indicate minimum and maximum values of a luminance range of a color volume. According to one embodiment of the present invention, this information may indicate minimum and maximum values between normalized 0 and 1 after luminance of a content is normalized to a value between 0 and 1 in a state that a maximum luminance value of a container delivering contents is set to 1. According to one embodiment, each of the minimum luminance value and the maximum luminance value may have a size of 4 data bytes.

The maximum target luminance value information indicates maximum luminance of a container used as a reference when luminance of a content is normalized. According to another embodiment, this information may indicate a maximum luminance value of a target display, a maximum luminance value of a mastering display, etc. In this case, the maximum luminance value of the target display and the maximum luminance value of the mastering display may be used as references when luminance of a content is normalized. According to one embodiment, this information may have a size of 4 data bytes.

FIG. 21 illustrates a configuration of a color volume descriptor according to another embodiment of the present invention.

According to one embodiment of the present invention, a color volume may be configured through a gamut boundary according to a luminance level. That is, according to one embodiment of the present invention, several luminance values may be designated in a color space, and a coordinate value in the color plane having the designated luminance value may be signaled to signal the color volume.

According to one embodiment of the present invention, the color volume descriptor may define a color boundary for a color plain according to the luminance level to indicate the color volume in more detail. The color boundary may be expressed as a coordinate on a color space or color plane according to a color space type. The color boundary may have the same meaning as that of the gamut boundary. The color boundary may have the same meaning as that of the color gamut expressed in a two-dimension, and may be defined by designating coordinate values of several colors.

The color volume descriptor according to one embodiment of the present invention may include total number of luminance ranges information, luminance value information, total number of primaries for level information, color coordinate 'a' information and/or color coordinate 'b' information.

The total number of luminance ranges information indicates the number of color plains in which the color boundary is expressed.

The luminance value information indicates a luminance value of a place where the color plain in which the color boundary is expressed is located within a color space. For example, if the color space is a CIELAB color space, this information indicates a value of L (luminance) components of a place where the color plain in which the color boundary is expressed is located. This information may have a normalized value between 0 and 1. According to one embodiment, the luminance value information may mean a luminance level.

The total number of primaries for level information indicates the number of points for indicating a color boundary for a corresponding luminance value.

The color coordinate 'a' information and the color coordinate 'b' information indicate coordinates of a point that configures a color boundary for a color plain determined by a luminance value. For example, if the color space is CIELAB, this information indicates a coordinate value in domains 'a' and 'b'.

FIG. 22 illustrates a configuration of a color volume descriptor according to still another embodiment of the present invention.

According to one embodiment of the present invention, a color boundary may be defined through various color representation methods to indicate a color volume in more detail. The color volume descriptor according to this embodiment may signal the color volume by defining coordinates of M_x points, which configure a color boundary for each of L luminance representation methods, and a luminance range in each coordinate.

The color volume descriptor according to this embodiment may include total number of color representations information, color representation type information, number of primaries information, color coordinate 'a' information, color coordinate 'b' information, minimum value information and/or maximum value information.

The total number of color representations information indicates a total number of color representation methods.

The color representation type information indicates a color representation method or a color space. For example, this information may indicate CIE1931 xyY, RGB, CIELAB, CIECAM02 LMS, LCh, YCbCr, etc.

The number of primaries information indicates the number of points that configures a color boundary within a color plain.

The color coordinate 'a' information and the color coordinate 'b' information indicate coordinates of a point that configures a color boundary within a color plain. For example, if the color representation method is CIELAB, this information indicates coordinate values in domains 'a' and 'b'.

The minimum value information and the maximum value information indicate a maximum luminance value and a minimum luminance value of points having a color coordinate 'a' and a color coordinate 'b'. That is, this information indicates a luminance range of a point that configures a color boundary.

FIG. 23 illustrates a configuration of a Dynamic Range and Mastering InfoFrame according to one embodiment of the present invention.

The Dynamic Range and Mastering InfoFrame according to one embodiment of the present invention is an InfoFrame for transmitting static metadata associated with video streams and data such as EOTF.

According to one embodiment of the present invention, the Dynamic Range and Mastering InfoFrame may be used to deliver a color volume. Since the Dynamic Range and Mastering InfoFrame may be used for delivery of static metadata which is information capable of being consistently applied to content playback, the Dynamic Range and Mastering InfoFrame may be used to deliver a container color volume, a mastering display color volume, a target display color volume and/or a content color volume capable of being applied to all images. At this time, a value 2 of an SMD_ID (Static_Metadata_Descriptor ID) field in the Dynamic Range and Mastering InfoFrame may indicate color volume information. According to this embodiment, if information included in the Dynamic Range and Mastering InfoFrame is used static information which is not changed for a certain time period, fixed values of update from previous frame info=0, cancel previous info=0, reuse current info=1, and end of video information=0 may be used except that initial information and final information are delivered. According to another embodiment of the present invention, the Dynamic Range and Mastering InfoFrame may separately include a flag or type field indicating whether the information included in InfoFrame is static information or dynamic information which is frequently changed.

According to this embodiment, the Dynamic Range and Mastering InfoFrame may include an InfoFrame Type Code field, an InfoFrame Version number field, a Legth of InfoFrame field, a Data Byte 1, a Data Byte 2, Data Byte 3, Data byte 4, Data Byte 5 and/or Data Bytes. According to this embodiment, Data Bytes 3 to Data Bytes may indicate a static metadata descriptor Static_Metadata_Descriptor. That is, the static metadata descriptor may include information included in Data Bytes 3 to Data Bytes.

The InfoFrame Type Code field of the Dynamic Range and Mastering InfoFrame may have a value of 0x07.

The Data Byte 1 includes an EOTF field, and the EOTF field identifies EOTF used for video streams.

The Data Byte 2 includes a Static_Metadata_Descriptor ID field, and this field identifies a structure used after the Data Byte 3. That is, this field may identify the static metadata descriptor described by data after Data Byte 3, and may specifically identify information included in this descriptor. According to this embodiment, a value 1 of the Static_Metadata_Descriptor ID field indicates HDR/WCG video information metadata type, and a value 2 of this field indicates a color volume. That is, the value 2 of this field indicates that the static metadata descriptor is a descriptor that includes information on a color volume.

The Data Byte 3 may include an information type field, an Update from previous frame info field, a Cancel previous info field, a Reuse current info field and/or an End of video Information field.

The Data Byte 4 may include a color volume type field, a Color space type field and/or a linear representation field.

The Data Byte 5 may include a transfer function type field and/or a recommended inverse transfer function type field.

The Data Bytes may include a color volume descriptor (information is modified in accordance with a color volume type).

A detailed description of the information included in Data Bytes after Data Byte 3 and the other fields will be replaced with the description of the color volume InfoFrame.

Figure 24:
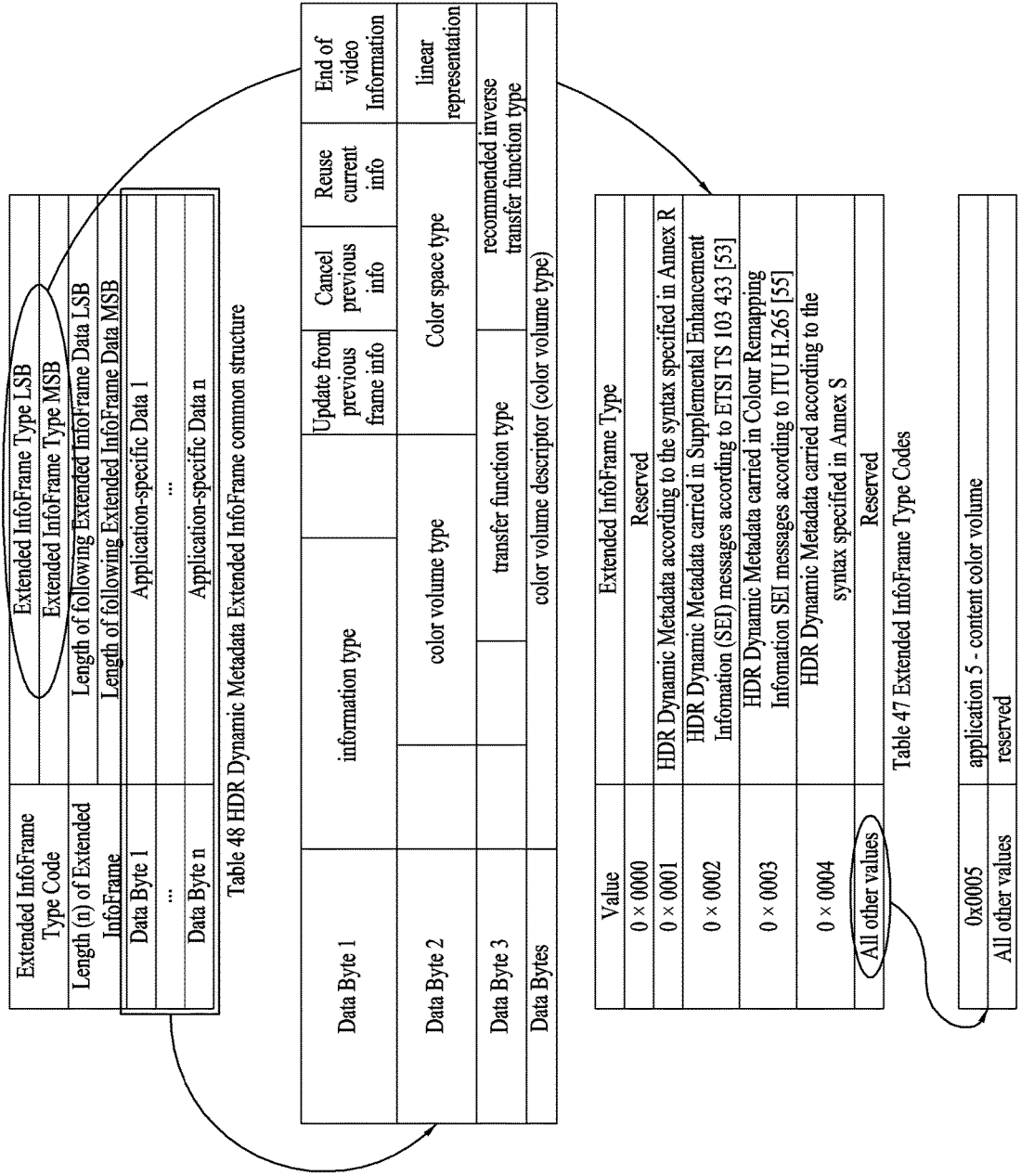
FIG. 24 illustrates a configuration of HDR Dynamic Metadata Extended InfoFrame according to one embodiment of the present invention.

FIG. 24 illustrates a configuration of HDR Dynamic Metadata Extended InfoFrame according to one embodiment of the present invention.

According to one embodiment of the present invention, the HDR Dynamic Metadata Extended InfoFrame may be defined to transmit data more than data allowed by base InfoFrame. According to this embodiment, the HDR Dynamic Metadata Extended InfoFrame includes HDR Dynamic Metadata. The HDR Dynamic Metadata Extended InfoFrame according to this embodiment may include an Extended InfoFrame Type Code field, a Length of Extended InfoFrame field and/or Data Byte 1 to n.

The Extended InfoFrame Type Code field identifies data transmitted within this InFoframe. According to one embodiment of the present invention, a value 0x0001 of this field identifies HDR Dynamic Metadata according to the syntax specified in Display Management Message, 0x0002 identifies HDR Dynamic Metadata carried in Supplemental Enhancement Information (SEI) messages according to ETSI TS 103 433, 0x0003 identifies HDR Dynamic Metadata carried in Colour Remapping Information SEI message according to ITU-T H.265, 0x0004 identifies HDR Dynamic Metadata carried according to the syntax specified in User_data_registered_itu_t_t35 SEI message, and 0x0005 identifies content color volume information.

The Length of Extended InfoFrame field indicates a length of Extended InfoFrame data.

The Data Byte 1 to n includes application-specific data identified by the Extended InfoFrame Type Code field. At this time, the application-specific data means data used to be limited to an application in a device. For example, the application-specific may mean data corresponding to a specific application only.

The Data Byte 1 may include an information type field, an Update from previous frame info field, a Cancel previous info field, a Reuse current info field and/or an End of video Information field.

The Data Byte 2 may include a color volume type field, a Color space type field and/or a linear representation field.

The Data Byte 3 may include a transfer function type field and/or a recommended inverse transfer function type field.

The Data Bytes may include a color volume descriptor (information is modified in accordance with a color volume type).

A detailed description of the information included in Data Bytes after Data Byte 1 and the other fields will be replaced with the description of the color volume InfoFrame.

According to this embodiment, HDR Dynamic Metadata Extended InfoFrame may be used to deliver a color volume. At this time, a value 0x0005 of the Extended InfoFrame Type field may identify a color volume. According to this embodiment, the HDR Dynamic Metadata Extended InfoFrame may be used to deliver information modified per frame, and may be used to deliver a content color volume. In this case, the HDR dynamic metadata (which means color volume information when the value of the Extended InfoFrame Type field is 0x0005) may be provided as information on one application. In this case, the sink device may perform image processing such as tone mapping and color gamut mapping determined based on content color volume information. According to another embodiment, the HDR Dynamic metadata Extended InfoFrame may transmit a mastering display color volume, a container color volume and a target display color volume as well as a content color volume.

Figure 25:
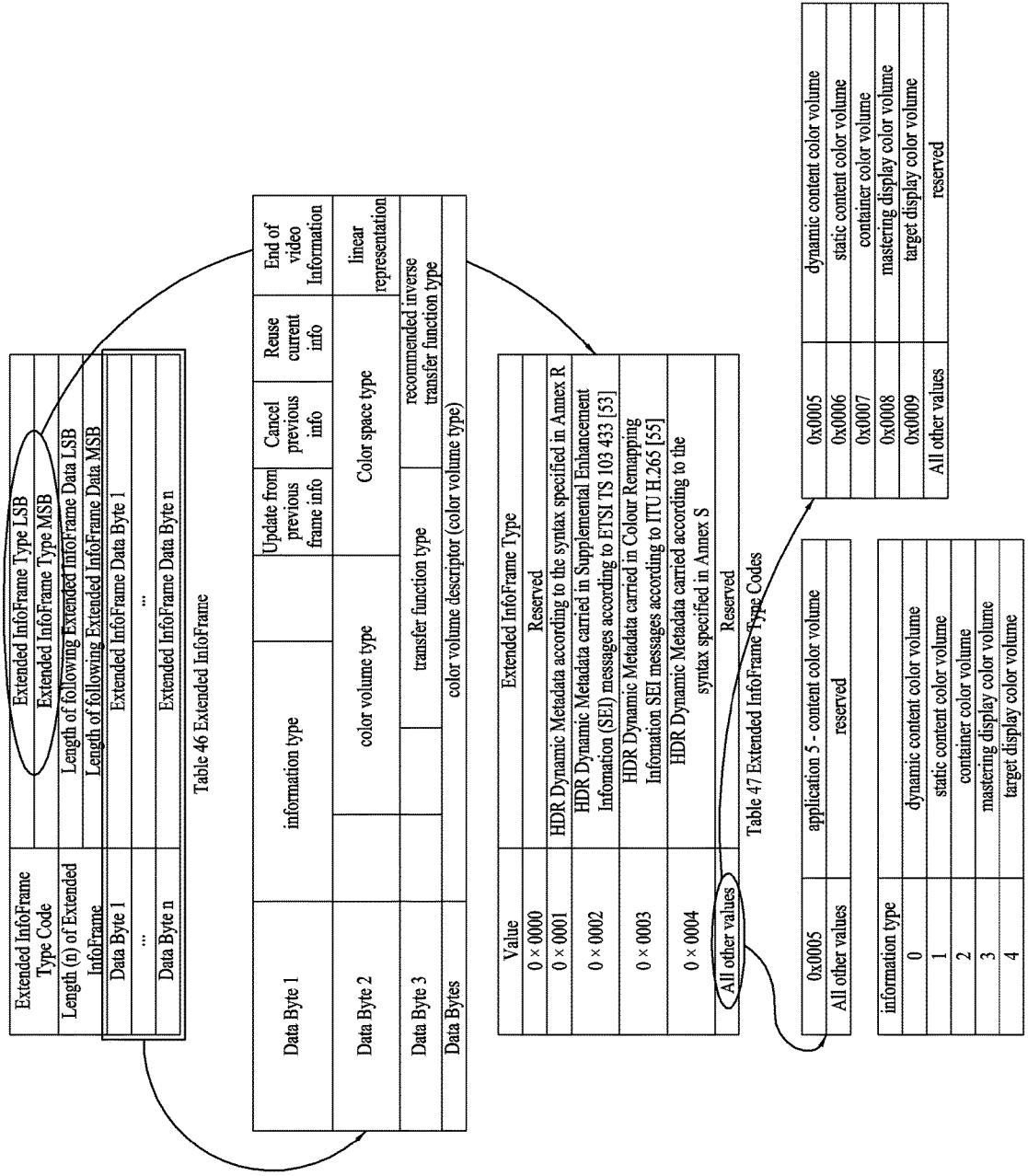
FIG. 25 illustrates a configuration of an Extended InfoFrame according to one embodiment of the present invention.

FIG. 25 illustrates a configuration of an Extended InfoFrame according to one embodiment of the present invention.

According to one embodiment of the present invention, color volume information may be delivered through the Extended InfoFrame as application independent information not application dependent information of the HDR dynamic metadata. According to this embodiment, a type of color volume information delivered using the Extended InfoFrame Type Code field or the information type information included in the Extended InfoFrame may be signaled. According to one embodiment, a content color volume as static metadata and a content color volume as dynamic metadata may respectively be delivered using the Extended InfoFrame Type Code field in the Extended InfoFrame. At this time, the Extended InfoFrame Type Code field may identify whether content color volume information included in the corresponding InfoFrame corresponds to static metadata or dynamic metadata, as each value. According to another embodiment, the content color volume information as static metadata may be delivered through the aforementioned dynamic range mastering InfoFrame, and the content color volume information as dynamic metadata may be delivered through the aforementioned HDR dynamic metadata extended InfoFrame.

According to this embodiment, the Extended InfoFrame may include an Extended InfoFrame Type Code field, a Length of Extended InfoFrame field and/or a Data Byte 1-n.

The Extended InfoFrame Type Code field identifies data transmitted within this InfoFrame. According to one embodiment of the present invention, a value 0x0001 of this field identifies HDR Dynamic Metadata according to the syntax specified in Display Management Message, 0x0002 identifies HDR Dynamic Metadata carried in Supplemental Enhancement Information (SEI) messages according to ETSI TS 103 433, 0x0003 identifies HDR Dynamic Metadata carried in Colour Remapping Information SEI message according to ITU-T H.265, 0x0004 identifies HDR Dynamic Metadata carried according to the syntax specified in User_data_registered_itu_t_t35 SEI message, and 0x0005 identifies content color volume information. According to another embodiment, the value 0x0005 of this field may identify a dynamic content color volume, 0x0006 may identify a static content color volume, 0x0007 may identify a container color volume, 0x0008 may identify a mastering display color volume, and 0x0009 may identify a target display color volume. At this time, the static content color volume indicates a content color volume as static metadata, and indicates content color volume information which is not changed for a certain time period. The dynamic content color volume indicates a content color volume as dynamic metadata, and indicates content color volume information which is frequently changed for a certain time period.

The Data Byte 1 to n includes Extended InfoFrame data identified by the Extended InfoFrame Type Code field. At this time, data included in the Data Byte 1 to n may correspond to independent data unlimited to an application in the device.

The information type field included in the Data Byte 1 indicates a type of information delivered by the Extended InfoFrame or a type of color volume information delivered by the Extended InfoFrame. According to one embodiment, a value 0 of this field may identify a dynamic content color volume, 1 may identify a static content color volume, 2 may identify a container color volume, 3 may identify a mastering display color volume, and 4 may identify a target display color volume.

A detailed description of the other fields shown in this drawing will be replaced with the description of the color volume InfoFrame or the HDR Dynamic Metadata Extended InfoFrame.

Figures 26, 27:
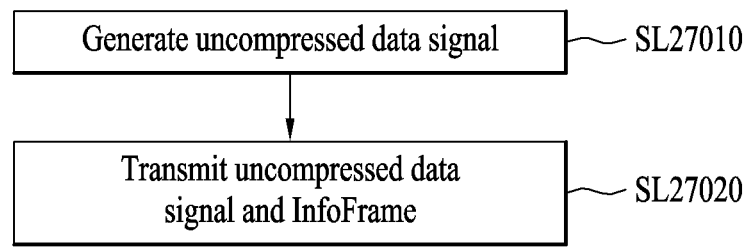
FIG. 26 illustrates a configuration of Extended Display Identification Data (EDID) according to one embodiment of the present invention.
FIG. 27 illustrates a data processing method according to one embodiment of the present invention.

FIG. 26 illustrates a configuration of Extended Display Identification Data (EDID) according to one embodiment of the present invention.

According to one embodiment of the present invention, the EDID are data allowed to use a plug and play function of a display (sink device). The EDID may describe a video format that can be received and rendered by the display. The EDID may be delivered from the sink device to the source device through an interface in accordance with a request of the source device. The source device may select an output format by considering a format of the original video streams and a format capable of being supported by the sink device. At this time, the EDID may be referred to as an EDID data block or a data block.

According to one embodiment of the present invention, before color volume information is delivered from the source device to the sink device, the sink device may notify the source device of information capable of being processed by the sink device. At this time, a new Tag Code value may newly be defined for the EDID or the existing value may be extended, whereby color volume information capable of being supported by the sink device may be signaled to the source device. That is, a new EDID data block (Display ID) for delivering color volume information may newly be defined, and color volume information supported by the sink device may be signaled using the existing Display Parameters Data Block, Display Device Data Block, Vendor-Specific Data Block, Product Identification Data Block, etc.

The EDID according to one embodiment of the present invention may include Byte 1 to Byte 5, wherein Byte 1 may include a Tag Code field and/or a Length of following data block field, Byte 2 may include an Extended Tag Code field, Byte 3 may include CV_0 field to CV_7 field, Byte 4 may include CS_0 field to CS-7 field, and Byte 5 may include RIT_0 field to RIT_7 field. According to another embodiment, Byte number in which the aforementioned field is included may be changed.

The Tag Code field may indicate a type of data delivered by corresponding EDID (data block), and may be used to identify a type of data delivered by the EDID. According to this embodiment, a value 0x07 of this field indicates that the corresponding data block includes an Exteded Tag Code field.

The Length of following data block field indicates a length of the corresponding data block.

The Extended Tag Code field indicates an actual type of corresponding data. According to this embodiment, a value 0x08 of this field may indicate that the corresponding data block is color volume information data block for delivering color volume information capable of being supported by the sink device.

The CV_0 field to the CV_7 field indicate color volume types capable of being processed by the sink device. The source device may select and transmit a color volume type capable of being processed by the sink device.

The CS_0 field to the CS_7 field indicate color spaces capable of being processed by the sink device. The source device may select and transmit a color volume type expressed in a color space capable of being processed by the sink device based on this information.

The RIT_0 field to the RIT_7 field indicate recommended inverse transfer functions capable of being processed by the sink device. The source device may select and transmit a color volume type expressed in an inverse transfer function capable of being processed by the sink device based on this information. According to another embodiment, if the source device should use an inverse transfer function incapable of being processed by itself and the sink device is capable of processing the corresponding inverse transfer function, the sink device may generate a linear signal by applying the inverse transfer function and then deliver the generated linear signal to the source device or an external device.

FIG. 27 illustrates a data processing method according to one embodiment of the present invention.

The data processing method according to one embodiment of the present invention may include a step of generating an uncompressed data signal (SL27010) and/or a step of transmitting the uncompressed data signal and InfoFrame (SL27020). The InfoFrame is a data transmission structure for transmitting information to a sink device that receives the uncompressed data signal, and includes a color volume descriptor describing information on a color volume. The InfoFrame may include type information indicating a type of the color volume according to a target of the color volume, color volume type information indicating the type of the color volume according to a method for defining the color volume, and color space type information indicating a type of a color space in which the color volume is expressed, and the color volume may correspond to one of a content color volume indicating a color volume of a content in accordance with the type information, a mastering display color volume indicating a color volume of a mastering display used for mastering of the content, a display color volume indicating a color volume of a display recommended for playback of the content, and a container color volume indicating a color volume of a container transmitting the content. The color volume may correspond to one of a first method for defining the color volume through color gamut and luminance range in accordance with the color volume type information, a second method for defining the color volume through a color boundary of a color plane according to a luminance level, and a third method for defining the color volume through a color boundary according to a color space in which the color volume is expressed. The data processing method according to this embodiment may indicate a data processing method in the source device. A detailed description of this embodiment has been described with reference to FIG. 19.

According to another embodiment, if the color volume is defined by the first method in accordance with the color volume type information, the color volume descriptor may include color gamut type information indicating a type of color gamut, maximum luminance value information indicating a maximum value of a luminance range in which the color volume is expressed and minimum luminance value information indicating a minimum value of a luminance range in which the color volume is expressed. The color volume descriptor may include reference luminance value information used to normalize a value indicated by the maximum luminance value information and the minimum luminance value information. A detailed description of this embodiment has been described with reference to FIG. 20.

According to still another embodiment, if the color volume is defined by the second method in accordance with the color volume type information, the color volume descriptor may include color plane number information indicating the number of color planes according to a luminance level, luminance information indicating a luminance value of a color boundary expressed in the color plane, point number information indicating the number of points that configure the color boundary, and coordinate information indicating coordinate values of the points on the color plane. A detailed description of this embodiment has been described with reference to FIG. 21.

According to further still another embodiment, if the color volume is defined by the third method in accordance with the color volume type information, the color volume descriptor may include color space number information indicating the number of color spaces that can express the color volume, color representation type information indicating a color space in which the color volume is expressed, point number information indicating the number of points that configure a color boundary according to the color space, coordinate information indicating coordinate values of the points, maximum value information indicating a maximum value of a luminance range in which the coordinate value of the point is expressed, and minimum value information indicating a minimum value of a luminance range in which the coordinate value of the point is expressed. A detailed description of this embodiment has been described with reference to FIG. 22.

According to further still another embodiment, the InfoFrame may include transfer function type information indicating a transfer function used to encode a linear signal of a content to a non-linear signal and inverse transfer function type information indicating an inverse transfer function recommended to transfer the non-linear signal of the content to the linear signal. A detailed description of this embodiment has been described with reference to FIG. 19.

According to further still another embodiment, the data processing method may include a step of receiving Extended Display Identification Data (EDID) describing information on the sink device, wherein the EDID may include information indicating a type of a color volume capable of being processed by the sink device, information indicating a type of a color space capable of being processed by the sink device, and information indicating an inverse transfer function capable of being processed by the sink device, among inverse transfer functions used to transfer a non-linear signal of a content to a linear signal. A detailed description of this embodiment has been described with reference to FIG. 26.

Figure 28:
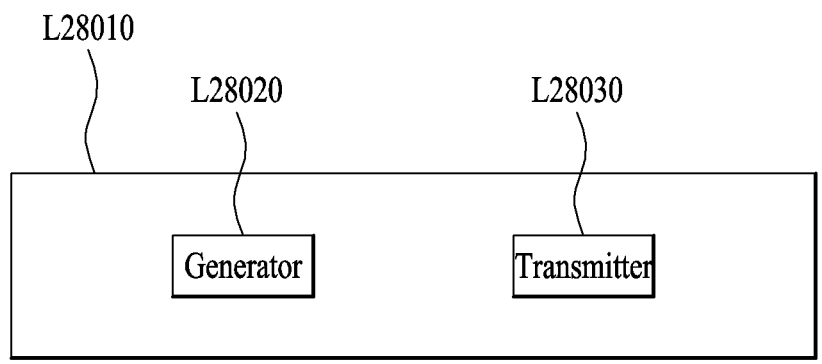
FIG. 28 illustrates a data processing apparatus according to one embodiment of the present invention.

FIG. 28 illustrates a data processing apparatus according to one embodiment of the present invention.

The data processing apparatus L28010 according to one embodiment of the present invention may include a generator L28020 generating an uncompressed data signal and/or a transmitter L28030 transmitting the uncompressed data signal and InfoFrame. The InfoFrame is a data transmission structure for transmitting information to a sink device that receives the uncompressed data signal, and includes a color volume descriptor describing information on a color volume. The InfoFrame may include type information indicating a type of the color volume according to a target of the color volume, color volume type information indicating the type of the color volume according to a method for defining the color volume, and color space type information indicating a type of a color space in which the color volume is expressed, and the color volume may correspond to one of a content color volume indicating a color volume of a content in accordance with the type information, a mastering display color volume indicating a color volume of a mastering display used for mastering of the content, a display color volume indicating a color volume of a display recommended for playback of the content, and a container color volume indicating a color volume of a container transmitting the content. The color volume may correspond to one of a first method for defining the color volume through color gamut and luminance range in accordance with the color volume type information, a second method for defining the color volume through a color boundary of a color plane according to a luminance level, and a third method for defining the color volume through a color boundary according to a color space in which the color volume is expressed. The data processing apparatus according to this embodiment may indicate a source device. A detailed description of this embodiment has been described with reference to FIG. 19.

According to another embodiment, if the color volume is defined by the first method in accordance with the color volume type information, the color volume descriptor may include color gamut type information indicating a type of color gamut, maximum luminance value information indicating a maximum value of a luminance range in which the color volume is expressed and minimum luminance value information indicating a minimum value of a luminance range in which the color volume is expressed. The color volume descriptor may include reference luminance value information used to normalize a value indicated by the maximum luminance value information and the minimum luminance value information. A detailed description of this embodiment has been described with reference to FIG. 20.

According to still another embodiment, if the color volume is defined by the second method in accordance with the color volume type information, the color volume descriptor may include color plane number information indicating the number of color planes according to a luminance level, luminance information indicating a luminance value of a color boundary expressed in the color plane, point number information indicating the number of points that configure the color boundary, and coordinate information indicating coordinate values of the points on the color plane. A detailed description of this embodiment has been described with reference to FIG. 21.

According to further still another embodiment, if the color volume is defined by the third method in accordance with the color volume type information, the color volume descriptor may include color space number information indicating the number of color spaces that can express the color volume, color representation type information indicating a color space in which the color volume is expressed, point number information indicating the number of points that configure a color boundary according to the color space, coordinate information indicating coordinate values of the points, maximum value information indicating a maximum value of a luminance range in which the coordinate value of the point is expressed, and minimum value information indicating a minimum value of a luminance range in which the coordinate value of the point is expressed. A detailed description of this embodiment has been described with reference to FIG. 22.

According to further still another embodiment, the InfoFrame may include transfer function type information indicating a transfer function used to encode a linear signal of a content to a non-linear signal and inverse transfer function type information indicating an inverse transfer function recommended to transfer the non-linear signal of the content to the linear signal. A detailed description of this embodiment has been described with reference to FIG. 19.

According to further still another embodiment, the data processing apparatus may include a receiver receiving Extended Display Identification Data (EDID) describing information on the sink device, wherein the EDID may include information indicating a type of a color volume capable of being processed by the sink device, information indicating a type of a color space capable of being processed by the sink device, and information indicating an inverse transfer function capable of being processed by the sink device, among inverse transfer functions used to transfer a non-linear signal of a content to a linear signal. A detailed description of this embodiment has been described with reference to FIG. 26.

Figure 29:
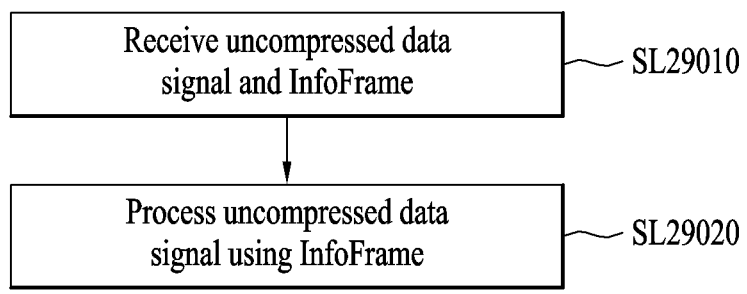
FIG. 29 illustrates a data processing method according to another embodiment of the present invention.

FIG. 29 illustrates a data processing method according to another embodiment of the present invention.

The data processing method according to another embodiment of the present invention may include a step of receiving an uncompressed data signal and InfoFrame (SL29010) and/or a step of processing the uncompressed data signal by using the InfoFrame (SL29020). The InfoFrame is a data transmission structure for transmitting information to a sink device that receives the uncompressed data signal, and includes a color volume descriptor describing information on a color volume. The InfoFrame may include type information indicating a type of the color volume according to a target of the color volume, color volume type information indicating the type of the color volume according to a method for defining the color volume, and color space type information indicating a type of a color space in which the color volume is expressed, and the color volume may correspond to one of a content color volume indicating a color volume of a content in accordance with the type information, a mastering display color volume indicating a color volume of a mastering display used for mastering of the content, a display color volume indicating a color volume of a display recommended for playback of the content, and a container color volume indicating a color volume of a container transmitting the content. The color volume may correspond to one of a first method for defining the color volume through color gamut and luminance range in accordance with the color volume type information, a second method for defining the color volume through a color boundary of a color plane according to a luminance level, and a third method for defining the color volume through a color boundary according to a color space in which the color volume is expressed. The data processing method according to this embodiment may indicate a data processing method in the sink device.

Figure 30:
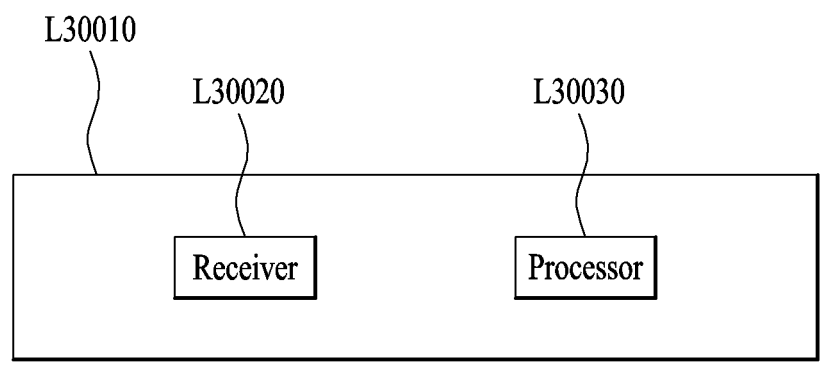
FIG. 30 illustrates a data processing apparatus according to another embodiment of the present invention.

FIG. 30 illustrates a data processing apparatus according to another embodiment of the present invention.

The data processing apparatus L30010 according to one embodiment of the present invention may include a receiver L30020 receiving an uncompressed data signal and/or a processor L30030 processing the uncompressed data signal by using the InfoFrame. The InfoFrame is a data transmission structure for transmitting information to a sink device that receives the uncompressed data signal, and includes a color volume descriptor describing information on a color volume. The InfoFrame may include type information indicating a type of the color volume according to a target of the color volume, color volume type information indicating the type of the color volume according to a method for defining the color volume, and color space type information indicating a type of a color space in which the color volume is expressed, and the color volume may correspond to one of a content color volume indicating a color volume of a content in accordance with the type information, a mastering display color volume indicating a color volume of a mastering display used for mastering of the content, a display color volume indicating a color volume of a display recommended for playback of the content, and a container color volume indicating a color volume of a container transmitting the content. The color volume may correspond to one of a first method for defining the color volume through color gamut and luminance range in accordance with the color volume type information, a second method for defining the color volume through a color boundary of a color plane according to a luminance level, and a third method for defining the color volume through a color boundary according to a color space in which the color volume is expressed. The data processing apparatus according to this embodiment may indicate a sink device.

The above-described modules or units may be processors that execute consecutive processes stored in a memory (or a storage unit). The steps described in the above-described embodiments can be performed by hardware/processors. The modules/blocks/units described in the above-described embodiments can operate as hardware/processors. In addition, the methods proposed by the present invention can be executed as code. Such code can be written on a processor-readable storage medium and thus can be read by a processor provided by an apparatus.

While the present invention has been described with reference to separate drawings for the convenience of description, new embodiments may be implemented by combining embodiments illustrated in the respective drawings. As needed by those skilled in the art, designing a computer-readable recording medium, in which a program for implementing the above-described embodiments is recorded, falls within the scope of the present invention.

The apparatus and method according to the present invention is not limitedly applied to the constructions and methods of the embodiments as previously described; rather, all or some of the embodiments may be selectively combined to achieve various modifications.

Meanwhile, the method according to the present specification may be implemented as code that can be written on a processor-readable recording medium and thus read by a processor provided in a network device. The processor-readable recording medium may be any type of recording device in which data are stored in a processor-readable manner. The processor-readable recording medium may include, for example, read only memory (ROM), random access memory (RAM), compact disc read only memory (CD-ROM), magnetic tape, a floppy disk, and an optical data storage device, and may be implemented in the form of a carrier wave transmitted over the Internet. In addition, the processor-readable recording medium may be distributed over a plurality of computer systems connected to a network such that processor-readable code is written thereto and executed therefrom in a decentralized manner.

In addition, it will be apparent that, although the preferred embodiments have been shown and described above, the present specification is not limited to the above-described specific embodiments, and various modifications and variations can be made by those skilled in the art to which the present invention pertains without departing from the gist of the appended claims. Thus, it is intended that the modifications and variations should not be understood independently of the technical spirit or prospect of the present specification.

In addition, the present specification describes both a product invention and a method invention, and descriptions of the two inventions may be complementarily applied as needed.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, rather than by the above description, and all changes that fall within the meaning and equivalency range of the appended claims are intended to be embraced therein.

The present specification describes both an apparatus invention and a method invention, and descriptions of the two inventions may be complementarily applied as needed.

Mode for Invention

Various embodiments have been described in the best mode for carrying out the invention.

INDUSTRIAL APPLICABILITY

The present invention is used in the field of providing a series of broadcast signals.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, rather than by the above description, and all changes that fall within the meaning and equivalency range of the appended claims are intended to be embraced therein.

The invention claimed is:

1. A data processing method comprising:
generating video data; and
transmitting the video data and an InfoFrame,
wherein the InfoFrame is a data transmission structure for transmitting information to a sink device,
wherein the InfoFrame includes a descriptor providing information on a color volume,
wherein the color volume corresponds to a mastering display color volume for indicating a color volume of a mastering display,
wherein the InfoFrame further includes an extended InfoFrame carrying extended InfoFrame data,
wherein the extended InfoFrame further includes type information for identifying a type of the extended InfoFrame data and length information for identifying a length of the extended InfoFrame data, and
wherein the extended InfoFrame data is High Dynamic Range (HDR) dynamic metadata.

2. The data processing method of claim 1, wherein a type code of the InfoFrame is 0x07.

3. The data processing method of claim 1, wherein HDR static metadata is carried through a data block, a tag code of the data block is 0x07 and an extended tag code is 0x06.

4. The data processing method of claim 1, wherein the InfoFrame further includes transfer function type information for indicating a transfer function used to encode the video data.

5. A data processing apparatus comprising:
a generator configured to generate video data; and
a transmitter configure to transmit the video data and an InfoFrame,
wherein the InfoFrame is a data transmission structure for transmitting information to a sink device,
wherein the InfoFrame includes a descriptor providing information on a color volume,
wherein the color volume corresponds to a mastering display color volume for indicating a color volume of a mastering display,
wherein the InfoFrame further includes an extended InfoFrame carrying extended InfoFrame data,
wherein the extended InfoFrame further includes type information for identifying a type of the extended InfoFrame data and length information for identifying a length of the extended InfoFrame data, and
wherein the extended InfoFrame data is High Dynamic Range (HDR) dynamic metadata.

6. The data processing apparatus of claim 5, wherein a type code of the InfoFrame is 0x07.

7. The data processing apparatus of claim 5, wherein HDR static metadata is carried through a data block, a tag code of the data block is 0x07 and an extended tag code is 0x06.

8. The data processing apparatus of claim 5, wherein the InfoFrame further includes transfer function type information for indicating a transfer function used to encode the video data.

9. A data processing method comprising:
receiving video data and an InfoFrame,
wherein the InfoFrame is a data transmission structure for receiving information from a source device,
wherein the InfoFrame includes a descriptor providing information on a color volume,
wherein the color volume corresponds to a mastering display color volume for indicating a color volume of a mastering display,
wherein the InfoFrame further includes an extended InfoFrame carrying extended InfoFrame data,
wherein the extended InfoFrame further includes type information for identifying a type of the extended InfoFrame data and length information for identifying a length of the extended InfoFrame data, and
wherein the extended InfoFrame data is High Dynamic Range (HDR) dynamic metadata; and
processing the video data by using the InfoFrame.

10. The data processing method of claim 9, wherein a type code of the InfoFrame is 0x07.

11. The data processing method of claim 9, wherein HDR static metadata is carried through a data block, a tag code of the data block is 0x07 and an extended tag code is 0x06.

12. A data processing apparatus comprising:
a receiver configured to receive video data and an InfoFrame,
wherein the InfoFrame is a data transmission structure for receiving information from a source device,
wherein the InfoFrame includes a descriptor providing information on a color volume,
wherein the color volume corresponds to a mastering display color volume for indicating a color volume of a mastering display,
wherein the InfoFrame further includes an extended InfoFrame carrying extended InfoFrame data,
wherein the extended InfoFrame further includes type information for identifying a type of the extended InfoFrame data and length information for identifying a length of the extended InfoFrame data, and
wherein the extended InfoFrame data is High Dynamic Range (HDR) dynamic metadata; and
a processor configured to process the video data by using the InfoFrame.

13. The data processing apparatus of claim 12, wherein a type code of the InfoFrame is 0x07.

14. The data processing apparatus of claim 12, wherein HDR static metadata is carried through a data block, a tag code of the data block is 0x07 and an extended tag code is 0x06.

* * * * *